US009836480B2

(12) United States Patent
Okun et al.

(10) Patent No.: US 9,836,480 B2
(45) Date of Patent: Dec. 5, 2017

(54) FILESYSTEM CAPACITY AND PERFORMANCE METRICS AND VISUALIZATIONS

(71) Applicant: Qumulo, Inc., Seattle, WA (US)

(72) Inventors: Zachary B. Okun, Seattle, WA (US); Eric J. Wright, Seattle, WA (US); Daniel J. Pirone, Seattle, WA (US); Thomas R. Unger, Seattle, WA (US); Alixandra M. Han, Seattle, WA (US)

(73) Assignee: Qumulo, Inc., Seattle, WA (US)

( * ) Notice: Subject to any disclaimer, the term of this patent is extended or adjusted under 35 U.S.C. 154(b) by 308 days.

(21) Appl. No.: 14/859,061

(22) Filed: Sep. 18, 2015

(65) Prior Publication Data

US 2016/0371297 A1 Dec. 22, 2016

Related U.S. Application Data

(60) Provisional application No. 62/181,091, filed on Jun. 17, 2015.

(51) Int. Cl.
G06F 17/30 (2006.01)
(52) U.S. Cl.
CPC .. *G06F 17/30221* (2013.01); *G06F 17/30126* (2013.01); *G06F 17/30327* (2013.01)
(58) Field of Classification Search
CPC ........... G06F 17/30082; G06F 11/1458; G06F 3/0631
USPC .......... 707/827, 637, 805; 715/748
See application file for complete search history.

(56) References Cited

U.S. PATENT DOCUMENTS

| 8,296,312 | B1 * | 10/2012 | Leung | G06F 17/30109 707/760 |
| 2005/0195660 | A1 * | 9/2005 | Kavuri | G06F 3/0605 365/189.05 |
| 2015/0067142 | A1 * | 3/2015 | Renkema | G06F 11/3476 709/224 |

OTHER PUBLICATIONS

Comer, Douglas, "The Ubiquitous B-Tree," Computing Surveys, vol. 11, No. 2, Jun. 1979. Computer Science Department, Purdue University, West Lafayette, Indiana 47907.
Bloom, Burton H., "Space/Time Trade-offs in Hash Coding with Allowable Errors," Communications of the ACM, vol. 13, No. 7, Jul. 1970. Computer Usage Company, Newton Upper Falls, Massachusettes.

* cited by examiner

*Primary Examiner* — Hung T Vy
(74) *Attorney, Agent, or Firm* — John W. Branch; Lowe Graham Jones PLLC

(57) ABSTRACT

A software and hardware facility persistently maintains metrics on directories at different levels within a tree of a filesystem. The facility hierarchically aggregates attributes of files contained by directories and stores them as metric values in each directory within a tree. The stored values represent summed or otherwise aggregated data from the descendant directories and files. The metric values represent aggregated attributes such as checksums, MIN and/or MAX aggregates, sameness bits, bloom filter aggregates, queryable user tags, moving average aggregates, b-tree aggregates, etc. The facility provides mechanisms for efficiently sampling activities performed by the filesystem and visually representing these activities.

19 Claims, 25 Drawing Sheets

| file | mtime | access permissions |
|---|---|---|
| /USR/file1 | 2010-01-19T06:53:59Z | 0775 |
| /USR/file2 | 2009-08-30T22:23:01Z | 0744 |
| /USR/USER1/file1 | 2014-05-10T23:12:59Z | 0755 |
| /USR/USER1/file2 | 2010-11-13T03:23:39Z | 0755 |
| /USR/USER1/music/file1 | 2012-02-29T16:21:11Z | 0755 |
| /USR/USER1/music/file2 | 2010-05-09T06:20:10Z | 0755 |
| /USR/USER1/photos/file1 | 2011-02-12T12:22:12Z | 0755 |
| /USR/USER1/photos/file2 | 2011-09-10T18:20:13Z | 0755 |
| /USR/USER2/file1 | 2014-05-11T23:12:59Z | 0744 |

| file | filesize (KB) | time-weighted size |
|---|---|---|
| /USR/file1 | 1 | 0 |
| /USR/file2 | 32 | 0 |
| /USR/USER1/file1 | 30 | 7.5 |
| /USR/USER1/file2 | 43,534 | 0 |
| /USR/USER1/music/file1 | 2,345 | 0 |
| /USR/USER1/music/file2 | 435 | 0 |
| /USR/USER1/photos/file1 | 546 | 0 |
| /USR/USER1/photos/file2 | 4 | 0 |
| /USR/USER2/file1 | 234,545 | 234,545 | music-a —1402

Figure 14:
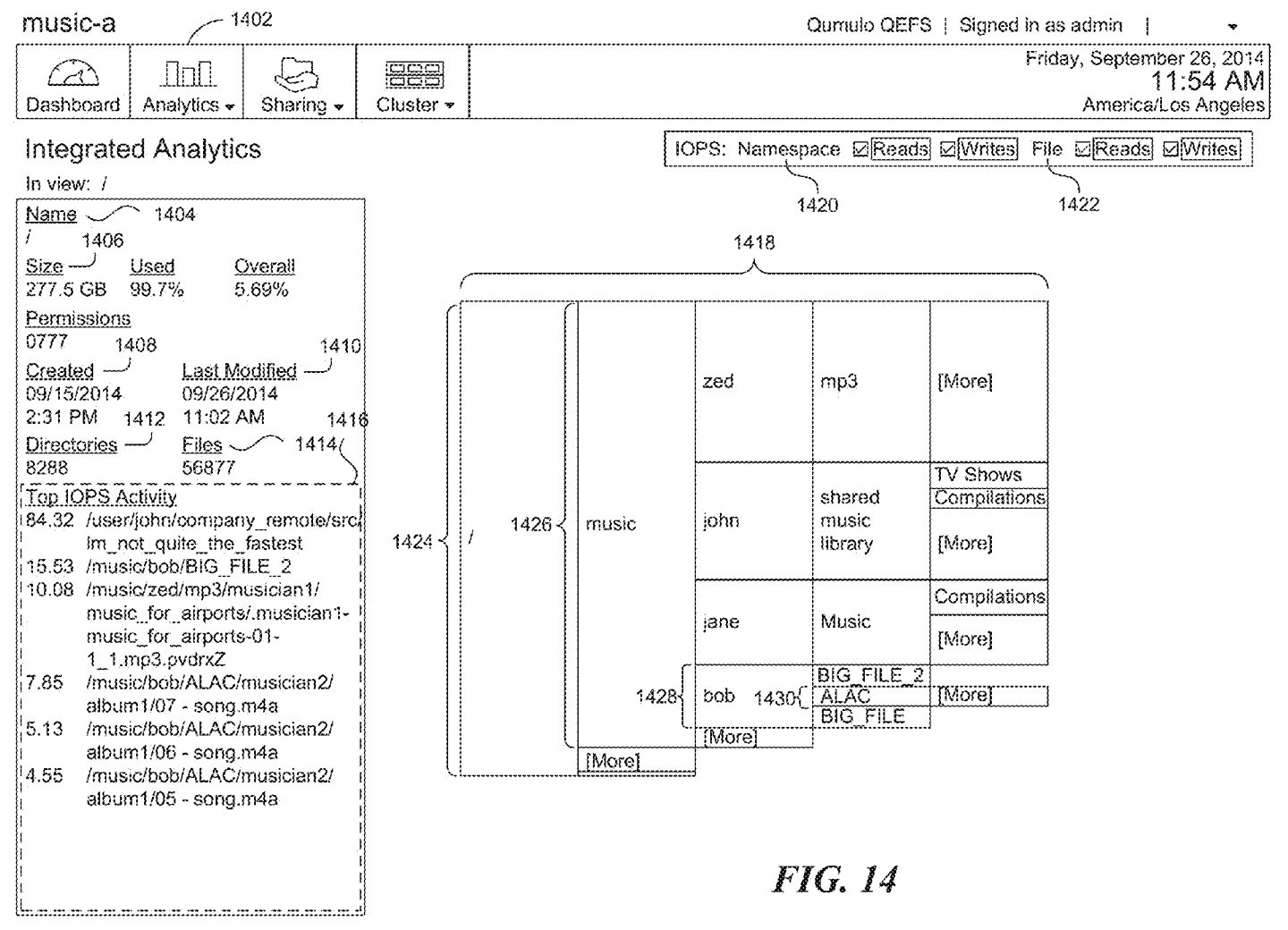

| Dashboard | Analytics ▾ | Sharing ▾ | Cluster ▾ |

Integrated Analytics

In view: /

| Name —1404 | | |
|---|---|---|
| / | | |
| Size —1406 | Used | Overall |
| 277.5 GB | 99.7% | 5.69% |
| Permissions | | |
| 0777 | | |
| Created —1408 | Last Modified —1410 | |
| 09/15/2014 | 09/26/2014 | |
| 2:31 PM —1412 | 11:02 AM —1414 | |
| Directories | Files —1416 | |
| 8288 | 56877 | |

Top IOPS Activity

| 84.32 | /user/john/company_remote/src/lm_not_quite_the_fastest |
| 15.53 | /music/bob/BIG_FILE_2 |
| 10.08 | /music/zed/mp3/musician1/music_for_airports/.musician1-music_for_airports-01-1_1.mp3.pvdrxZ |
| 7.85 | /music/bob/ALAC/musician2/album1/07 - song.m4a |
| 5.13 | /music/bob/ALAC/musician2/album1/06 - song.m4a |
| 4.55 | /music/bob/ALAC/musician2/album1/05 - song.m4a |

Qumulo QEFS | Signed in as admin
Friday, September 26, 2014
11:54 AM
America/Los Angeles IOPS: Namespace ☑Reads ☑Writes File ☑Reads ☑Writes —1422

—1420

—1418

—1424

| music | zed | mp3 | [More] |
|---|---|---|---|
| | | | TV Shows |
| | | | Compilations |
| | john | shared music library | [More] |
| | | | Compilations |
| | jane | Music | [More] |
| —1426 | bob 1430 | BIG_FILE_2 | |
| | | ALAC | |
| | | BIG_FILE | [More] |
| [More] | [More] | | |

—1428

*FIG. 14* music-a

Dashboard | Analytics ▾ | Sharing ▾ | Cluster ▾

Qumulo QEFS 1.0.14 build 32395.1.2 | Signed in as admin ▾ |
Thursday, October 9, 2014
4:21 PM
America/Los Angeles Integrated Analytics ⌐ 1500

In view: / music

Name ⌐ 1502
music
Size    Used
1.3 TB  27.7%
Permissions
0777
Created      Last Modified
09/15/2014   10/09/2014
2:33 PM      3:38 PM
Directories  Files
23717        194631
Top IOPS Activity
No significant IOPS activity IOPS: Namespace ☑Reads ☑Writes   File ☑Reads ☑Writes 1510   1512   1514   1516 music | zed | mp3 | 000_MISC
      | zoso |    |
      | ned  | BIG_FILE_4 |
      | jane | shared music library |

FILESYSTEM CAPACITY AND PERFORMANCE METRICS AND VISUALIZATIONS

CROSS-REFERENCE TO RELATED APPLICATION(S)

This application claims the benefit of U.S. Provisional Application No. 62/181,091 entitled "FILESYSTEM CAPACITY AND PERFORMANCE METRICS AND VISUALIZATIONS," filed on Jun. 17, 2015, which is hereby incorporated by reference in its entirety. This application is related to U.S. Provisional Application Nos. 61/982,926 entitled DATA STORAGE SYSTEM" and 61/982,931 entitled "DATA STORAGE SYSTEM," both filed on Apr. 23, 2014, U.S. Non-Provisional application Ser. No. 14/595,043, filed on Jan. 12, 2015 and entitled "FILESYSTEM HIERARCHICAL AGGREGATE METRICS," U.S. Non-Provisional application Ser. No. 14/595,598 entitled "FAIR SAMPLING IN A HIERARCHICAL FILESYSTEM," filed on Jan. 13, 2015, and U.S. Non-Provisional application Ser. No. 14/658,015 entitled "DATA MOBILITY, ACCESSIBILITY, AND CONSISTENCY IN A DATA STORAGE SYSTEM," filed on Mar. 13, 2015, each of which is hereby incorporated by reference in its entirety. In cases where the present application and a document incorporated herein by reference conflict, the present application controls.

TECHNICAL FIELD

The described technology is directed to the field of filesystems.

BACKGROUND

The demand for scalable storage resources and the ability to provide rapid access to content stored thereby is a key concern to end-users. Enterprises, businesses, and individuals alike now use large scale filesystems to store data that is remotely accessible via a network. Such filesystems are often accessible via closed (e.g., enterprise) and open (e.g., Internet) networks and allow concurrent access via multiple client devices. Various implementations of large scale filesystems relying on network access have been developed. The primary differences between such filesystems are (1) that they use different protocols for the client devices and servers to communicate to read and write data and (2) that the data and corresponding metadata are stored in different ways.

For some filesystems, the protocol provides access to end-users by implementing APIs through a network, while others are specific to operating systems. Some such operating systems include default programs which may be called to synchronously determine and display filesystem information to an end-user. For example, UNIX includes a .du program which return file space usage of a directory.

Users benefit from knowing the amount of storage resources as well as the allocation of those resources to various portions of the filesystem, such as directories, subdirectories, and files in a filesystem hierarchy, in order to facilitate management of the filesystem. For example, administrators can allocate system resources to frequently accessed nodes and can determine if additional storage capacity is required.

Systems administrators find useful various kinds of filesystem queries. For example, one system administrator may wish to generate a list of all files created in the past hour.

BRIEF DESCRIPTION OF THE DRAWINGS

FIG. 14 is a display diagram showing an interactive GUI provided by the facility that indicate metric values for directories of a filesystem hierarchy.

FIGS. 15A-15C are display diagrams showing different directory levels selectable through an interactive GUI provided by the facility that indicate metric values for directories of a filesystem hierarchy.

DETAILED DESCRIPTION

Figure 1:
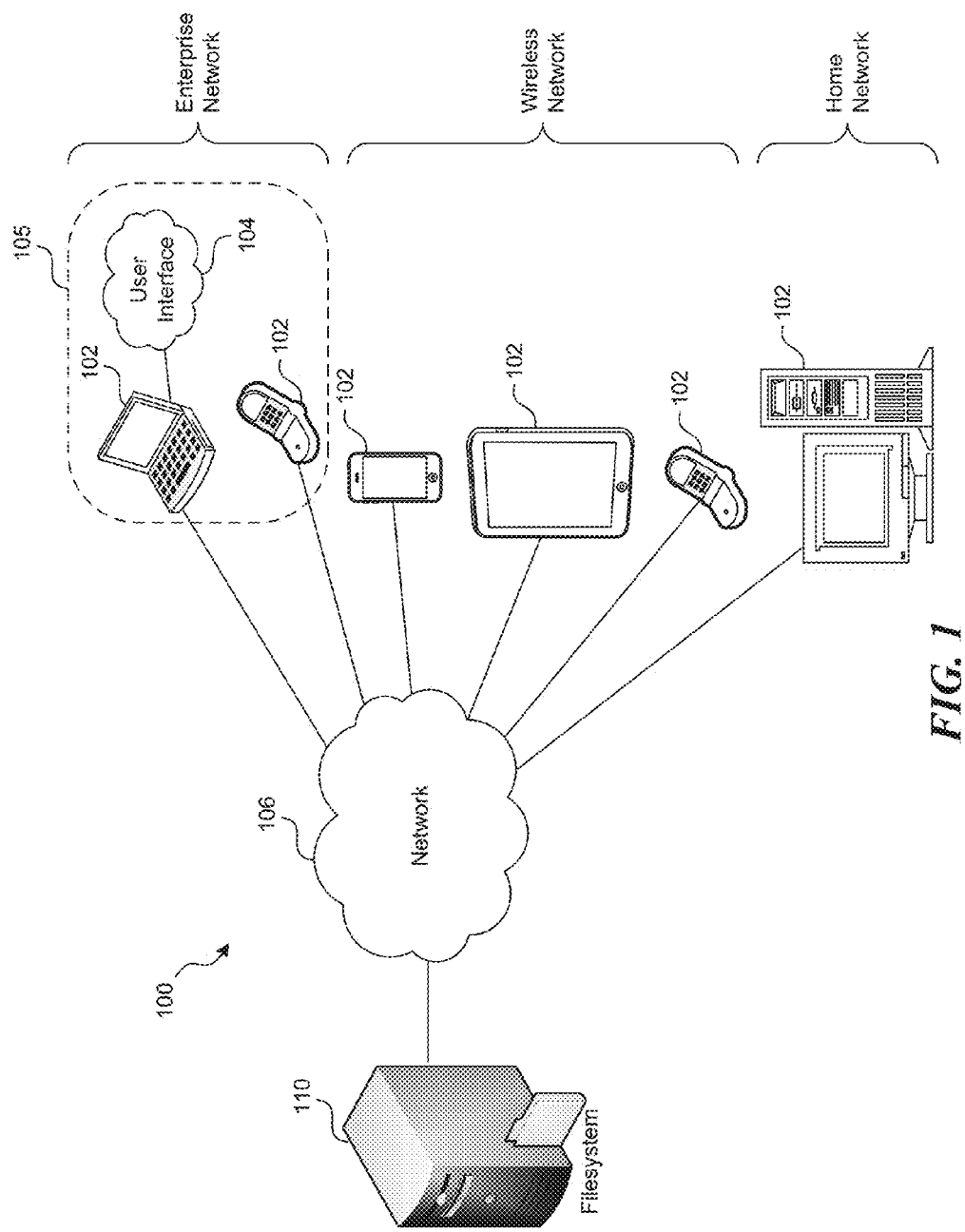
FIG. 1 shows an environment in which the facility operates.

The inventors have recognized that conventional filesystems incur significant latency in aggregating metadata attributes of files to obtain hierarchical aggregate metric values ("metric values") that provide a user with visibility into the filesystem. Traditionally, in tree-structured filesystems, in order to satisfy a request for metrics for a subtree of the filesystem, it has been necessary to systemically and recursively traverse an entire subtree in response to the request. The tree-structured filesystems discussed herein comprise a hierarchical tree of filesystem objects—directories and files—that include a root directory. Each filesystem object contains inode data that includes filesystem administration information. The filesystem object may be directly accessed by the filesystem via filesystem path or address, and the data contained in the inode data may be used by the filesystem to manage the hierarchy.

For example, if a user wants to know how much storage capacity is available in a particular user space, such as in a subtree of the filesystem hierarchy contained by a directory, a conventional filesystem must synchronously aggregate a file size metadata attribute value for each file in each filesystem object in the subtree to return the aggregated value to the user. In another example, if the user wants to know how much storage is dedicated to .crw files in the filesystem, conventional filesystems must synchronously check each file's type and aggregate the size of each that is a .crw file. Not only is does this create an imbalance in system performance, but it imposes a high cost in terms of number of I/O operations. More importantly, it may take hours to return the requested value to the user, depending on the size of the filesystem and its hardware components.

In addition, for conventional filesystems in which numerous users concurrently access the files, the returned values may fail to reflect any modifications to data that occur during the slow scan. Using the prior example, a second user may access the system and delete 2 TB (terabytes) of .crw files in a particular directory. However, if the scan accesses the directory containing those files prior to the deletion and returns the result subsequent to the deletion, that result is inaccurate and will fail to reflect the modified data.

To avoid latency, performance fluctuations, increased I/O costs, and other issues, the inventors have determined that it is desirable to maintain for each directory in a filesystem tree, persistent hierarchical aggregates or "metric values" for file attributes of the filesystem objects contained by the subtree defined by that directory. Accordingly, a request for such metrics for a particular subtree can be satisfied without exhaustively traversing each level of the subtree of the filesystem tree structure in response.

A software and hardware facility described herein ("the facility") addresses these issues by persistently maintaining metrics on directories at different levels within a filesystem tree. The facility may operate with respect to a distributed or monolithic filesystem, such as one maintained by a number of networked nodes in a cluster. In particular, in some embodiments, the facility aggregates attributes of filesystem objects using, for example, a deterministic function, and stores them as metric values in each directory within a tree.

In some embodiments, the values stored in a directory represent data summed or otherwise aggregated from filesystem objects contained by an entire subtree of filesystem objects—directories and files—defined by that directory. In some embodiments, the metric values may represent such measures as total space consumed by a filesystem object and all the descendant objects, total number of files within an filesystem object, total data blocks used by a filesystem object and its descendant filesystem objects (if any), etc.

In some embodiments, the metrics stored in a directory containing no other directories is determined by performing an aggregation or other logical operation on attributes of the files contained by the directory. In some embodiments, the metrics stored in other directories are each determined by performing an aggregation or other logical operation on the attributes of the files contained by the directory itself, further aggregated with the corresponding metrics of the child directories. For example, metric values may provide: a most recently accessed filesystem object including all its descendant objects, a most frequently accessed filesystem object in a tree or subtree, a largest filesystem object in set of objects in a tree or subtree, and the like.

In some embodiments, the facility provides additional aggregates or metric values, such as checksum aggregates, MIN and/or MAX aggregates, sameness bits, bloom filter aggregates, queryable user tags, moving average aggregates, b-tree aggregates, and so on. Checksum aggregates represent a checksum of all files stored in a particular folder and its subfolders. A MIN aggregate for a folder represents, for a given attribute, the minimum value of that attribute for all files and folders in the folder and its subfolders, such as the minimum filesize or last modified time. A MAX aggregate for a folder represents, for a given attribute, the maximum value of that attribute for all files and folders in the folder and its subfolders, such as the maximum number of users that have accessed a file or creation time. A sameness bit for an attribute represents whether all files in a folder have the same value for the given attribute and can be aggregated for a folder by AND-ing the corresponding sameness bit of each of subfolder of the folder. A bloom filter aggregate for a folder can be used to determine whether the folder or its subfolders may or does not contain a file with a particular attribute value. A queryable user tag allows a user to create custom attributes or metadata for files that can then be indexed, aggregated, and so on. A moving average aggregate provides an estimate of diskspace usage for a given period. Furthermore these aggregates or metric values may be applied to a variety of hierarchical structures, such as a b−tree, b+tree, b*−tree, binary tree, and so on. In some examples aggregates are stored as separate, additional data values within blocks or nodes of a hierarchical structure, while in other examples the aggregates are stored within other data structures, such as standard keys of a b−tree. In this manner, the facility is able to scale the implementation of aggregations to filesystems that have very large directories.

In some embodiments, the facility provides a graphical user interface or visualizations to allow users to more easily comprehend the current status and activities of the filesystem. For example, the facility can use aggregate metrics and other metadata to determine how the filesystem is behaving and where resources are being allocated. In some embodiments, the graphical user interface includes activity bars that each represent numbers of activities performed by users, clients, or activities performed with respect to directories and/or files. In some embodiments, the graphical user interface includes diskspace usage charts showing the extent to which available diskspace is used by the filesystem and/or directories or files within the filesystem. In some embodiments, the graphical user interface includes features that represent the extent to which a directory or file has grown (negatively or positively) over a given period. In some embodiments, the facility periodically samples activities within the filesystem to determine how the filesystem is behaving and where resources are being used in the filesystem. In some embodiments, the facility uses an exponentially decaying sample rate to generate activity samples used to generate the graphical user interface.

By performing in some or all of the ways described above, the facility enables rapid access to metric values based on file attributes and aggregates stored at various levels in the filesystem. Because the metric values for those attributes are maintained in each directory and are updated frequently, the facility typically does not need to traverse significant portions of the filesystem tree in order to determine corresponding metric value.

FIG. 1 illustrates an environment 100 in which the facility may operate. For example, a filesystem may communicate over a network 106, such as the Internet, with computing systems, e.g., clients 102, through a secondary network. In particular, the user executes a browser program on a client in order to display the contents of a user interface which may be used to generate and execute requests to access the facility, e.g., filesystem 110. In some embodiments, a secondary network may include an enterprise network, wireless network, or home network on which the client is operating. A variety of proxy servers or gateway devices may be additionally included in the communication path between the facility 110 and the client 102, though not specifically shown in the illustrated environment. In various embodiments, a variety of computing systems or other devices may be used as client computer systems, such as mobile phones, personal digital assistants, tablet computers, etc.

In various embodiments, the facility includes computer systems and devices including zero or more of each of the following: a central processing unit ("CPU") for executing computer programs; a computer memory for storing programs and data while they are being used, including the facility and associated data, an operating system including a kernel, and device drivers; a persistent storage device, such as a hard drive or flash drive for persistently storing programs and data; a computer-readable media drive, such as a floppy, CD-ROM, or DVD drive, for reading programs and data stored on a computer-readable medium; and a network connection for connecting the computer system to other computer systems to send and/or receive data, such as via the Internet or another network and its networking hardware, such as switches, routers, repeaters, electrical cables and optical fibers, light emitters and receivers, radio transmitters and receivers, and the like.

While computer systems configured as described above are typically used to support the operation of the facility, those skilled in the art will appreciate that the facility may be implemented using devices of various types and configurations, and having various components. Furthermore, while various embodiments are described in terms of the environment described above, those skilled in the art will appreciate that the facility may be implemented in a variety of other environments including a single, monolithic computer system, as well as various other combinations of computer systems or similar devices connected in various ways.

Figure 2:
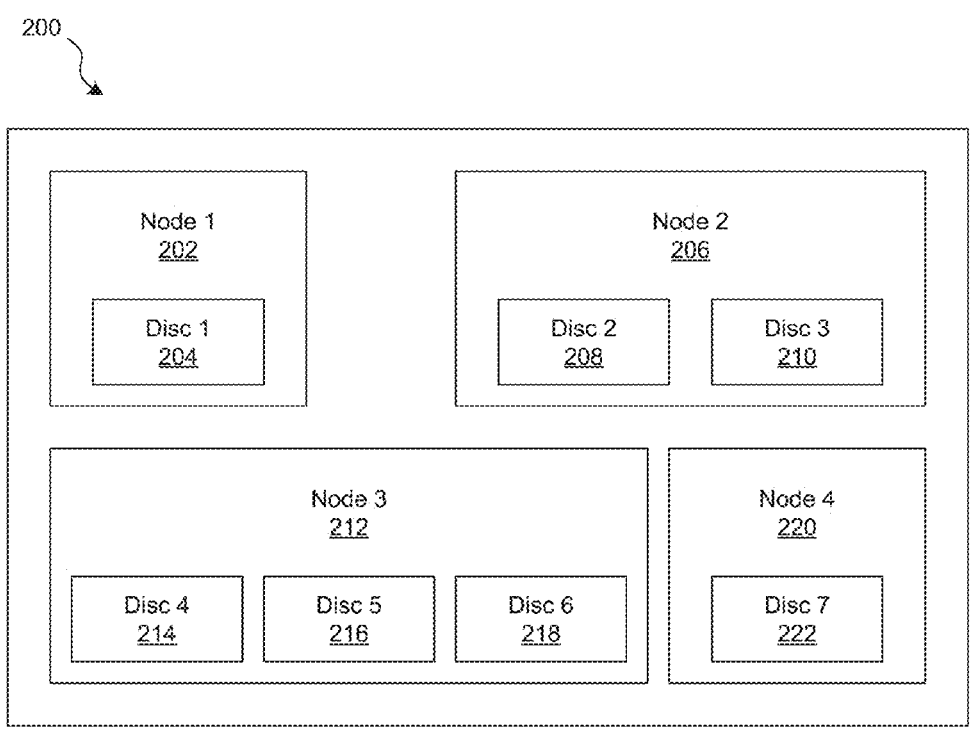
FIG. 2 is a block diagram illustrating a cluster of storage devices operated by the facility.

FIG. 2 is a block diagram of cluster 200 in a distributed filesystem in which numerous storage devices may be networked together for use in connection with the facility. One or more storage devices additionally may be coupled together in groups, forming nodes (e.g., Node 1 202, Node 2 206, Node 3 212, Node 4 220) within the facility. Each node within the cluster 300 has a particular address, or path name accessible via the network filesystem protocol, an instance of which is included on each node. Accordingly, each node in the cluster 200 typically includes one or more computer processors or controllers and data storage devices such as hard disks, solid state disk drives, or similar computer readable storage or memory devices. For example, a node may include one or more server computers themselves, contained by such components. Each of the data storage devices (e.g., disc1 204, disc2 208, etc.) within a node may store data in blocks, the stored data corresponding to files contained by filesystem object data of the hierarchical tree structures implemented by the facility.

Figure 3:
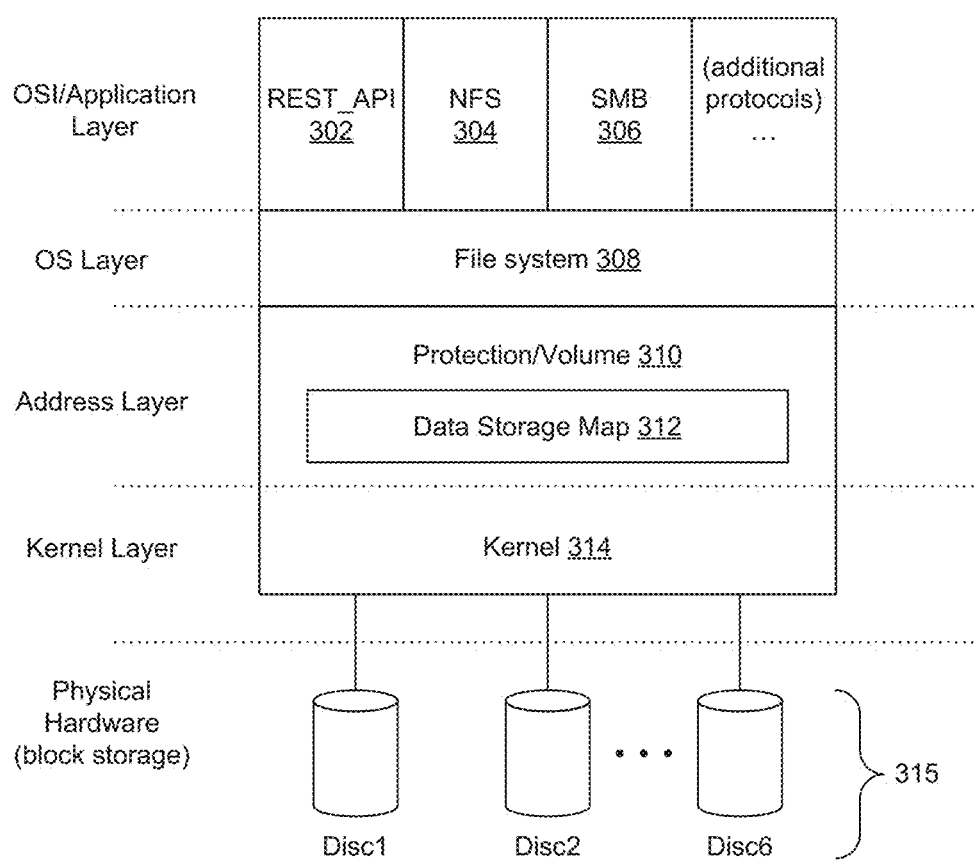
FIG. 3 is an abstraction level diagram of the facility.

FIG. 3 illustrates abstraction layers provided by the facility in some embodiments. For example, the layers can include an application layer, an operating system layer (OS) that includes a host (local) filesystem, an address abstraction layer that includes a protection/volume 310 (e.g., a protected storage unit) referenced by the local filesystem 308 and a kernel layer that translates requests from the OS layer and an address provided by the address layer.

The application layer of the facility exposes an instance of a web application programming interface (API) 302 (e.g., REST), a network filesystem protocol 304 (NFS), and an application layer network protocol 306 (e.g., SMB). The NFS protocol 304 is an application level protocol used to access the facility over a network, such as the Internet. The application layer network protocol 306 may be used to communicate with other nodes in the facility, accessible by the NFS 304. In some embodiments, the application layer includes protocols such as http, ftp, scp, rsync, afp, afs, or a variety of other application layer protocols capable of providing network-level access to the facility. Any of the aforementioned protocols are considered reasonable variations to the illustrated protocols and may be used in addition to or in place of those protocols.

An OS layer implements a core filesystem 308. To access stored data, the core filesystem 308 references a location (e.g., in a protected storage unit) which is used by the address abstraction layer to retrieve the requested data. Accordingly, the address abstraction layer can include a data storage map 312 that links the referenced location to a particular node and associated disc (e.g., see FIG. 2) on which the requested data is stored.

The facility also includes the kernel layer that translates the filesystem call (for the requested data) into instructions for hardware components. The hardware components may be located in a hardware layer and may include a plurality of storage devices 315 (e.g., disc1, disc2, disc3) that can be distributed across multiple storage nodes.

In some embodiments, the facility manages metric requests for filesystem objects through the web API 302. These requests are stateless in order to account for various platforms on which filesystem may be implemented. Accordingly, calls made from a client device, such as devices 102 in FIG. 1, can request a metric value to be retrieved for one or more filesystem objects stored by the facility. Exemplary metric value requests in some embodiments are provided in the following table:

| | |
|---|---|
| capacity_usage | total blocks used for file data (not metadata) |
| moving_capacity_usage | moving sum of capacity_usage (exponentially decayed, 60 minute lifetime) |

| | |
|---|---|
| num_directories | total directory count under the filesystem object |
| num_files | total file count under the filesystem object |
| num_input_operations | total number of write operations on files |
| moving_input_operations | moving sum of num_input_operations (exponentially decayed, 60 minute lifetime) |

Each of the metric requests within the table typically returns a value indicating an aggregate value of attributes for a collection of files contained by a directory within the facility. In some embodiments, the metric requests return integer values for aggregated attributes of a file in the facility. The capacity usage and the moving capacity usage may be in units of bytes and, in some embodiments, include 4096-byte data blocks. Some of the metrics maintained by the facility are aggregations on filesystem object attributes of types other than integer. For example, in some embodiments, the facility maintains a recent access ("raccess") time metric based on applying a latest( ) aggregation function to an access time ("atime") attribute maintained for each descendant filesystem object. In some embodiments, the metrics are checksums. In various embodiments, the facility maintains other aggregates based on, combinations of when filesystem objects were last accessed, changed, modified, created, archived, transferred, deleted, revived, or based on filesize (e.g., minimum and/or maximum filesizes).

In some embodiments, the facility maintains a checksum aggregate for folders within a subtree. The checksum aggregate generated by calculating, for each folder, a checksum (e.g., XOR, cyclic redundancy check, longitudinal parity check) and/or hash (e.g., SHA-256, MD5) of all of the files and subfolders within that folder. One of ordinary skill in the art will recognize that a variety of checksum functions/algorithms and/or hash functions are used to generate a checksum and corresponding checksum aggregates. For example, in some embodiments the facility uses SHA-256 to generate hash values for individual files within a folder and XOR the generated hash values for individual files and the checksum aggregates for each subfolder to generate a checksum aggregate for the folder. The checksum aggregates enable a computing system to quickly compare contents of a directory tree by comparing the checksum aggregates rather than comparing each individual file or folder. In this manner, the facility improves the rate at which a computing system performs various actions, such as bi-directional replication, de-duplication, and the freeing of file cache space. For example, a process for de-duplicating files and folders uses the checksum aggregates to determine whether two or more folders contain (or are likely to contain) identical files rather than separately scanning each folder. As another example, a replication system (such as a cloud backup storage system), the checksum aggregates allow for quicker identification of changes between a folder and a previously-stored version (i.e., snapshot) of that folder or between two or more snapshots. If the checksum aggregate for a current version of a folder and the aggregate checksum for a previously-stored version of the folder are the same, then the two versions are likely to be the same. If, however, the checksum aggregate for the current version of a folder and the checksum aggregate for the previously-stored version of the folder are not the same, then the two versions are not the same. In this case, the facility compares checksum aggregates for each subfolder and file within each version of the folder to identify where the changes have occurred. In some embodiments, the computing system checks subfolders before files if, for example, the ratio of files to folders greater than a predetermined threshold (e.g., 500 to 1 or 100 to 1). In other embodiments, the computing system checks the files before subfolders. In some embodiments, if a difference is found, the new version is backed up and the computing system recalculates the aggregate checksum(s) (i.e., the aggregate checksum for the folder storing the changed file and the aggregate checksum for each of its parent folders) to determine whether there are additional differences. Thus, the checksum aggregates improve the rate at which a computing system compares folders and different versions of those folders to, for example, quickly identify changes between a folder and a snapshot of that folder.

In some embodiments, the facility enables the use of a "sameness bit" aggregate for one or more attributes or metadata. A sameness bit specifies whether every object within a folder (and all of its subfolders) has the same value for a particular attribute or metadata element. For example, if all of the files within a folder and its subfolders have the same access permissions (e.g., read, write, and execute for an owner class and read-only for all other classes), then a "permissions sameness bit" aggregate is set to 1 for that folder (and all of its subfolders). If, however, one or more of the files becomes writeable by a class other than the user class, then the facility updates the "permissions sameness bit" aggregate to 0 for the folder that contains it, and any ancestor folders up to the nearest ancestor for which the bit is 0. As another example, if all of the files within a folder and its subfolders have the same owner, then the facility sets an "owner sameness bit" aggregate to 1. A sameness bit aggregate improves the rate at which a computing system identifies files and folders, such as those relevant to a particular query. For example, if a user is searching for all writeable files, then the computing system skips or eliminates searching any folder (and its subfolders) having a "read-only sameness bit" set to 1 (i.e., all of the files in the folder (and its subfolders) are either read-only or not read-only) and containing a file that is not writeable. Similarly, if a user is searching for all files owned by "USER1" and a folder with an "owner sameness bit" set to 1 is found to contain a file owned by "USER2," then the rest of the contents of that folder (and all of its subfolders) are skipped. In some embodiments, the facility maintains a sameness aggregate that is larger than a bit, such as a byte, word, string, and so on. For example, if an owner sameness string is set to "Alice" for a particular folder and a user is searching for all files owned by another user, then the computing system skips that folder. In this manner, the sameness attributes enable improved search times by enabling a search process to quickly identify folders (and corresponding files and subfolders) that to be skipped during a search or other process.

In some embodiments, the facility maintains a bloom filter aggregate for one or more attributes. A bloom filter is a probabilistic data structure used to determine whether a particular element is likely to belong to a particular set. While a bloom filter can produce false positives, it does not produce false negatives. For example, a bloom filter can be used to determine whether a particular folder may contain any files having a particular attribute, such as a particular owner, creator, mtime, and so on. If a user is searching for all files owned by USER1, a computing system can apply a bloom filter configured to determine whether a particular folder may contain or does not contain any files owned by any particular user. In some embodiments, a bloom filter is represented as a bit string and generated by applying multiple hash functions to an attribute value for a particular file or folder, each hash function generating a placement in the bit string, and setting corresponding bits in the bit string to 1. For example, after adding 3 files to a folder an "owner bloom filter aggregate" for that folder (i.e., a bloom filter that represents the owners of the files in that folder) is represented by the following bit string:

0010 1000 0110 0100

When another file is added to the folder, the owner attribute for that file is submitted to the multiple hash functions and a new bit string (e.g., a bit string initialized to zero) is generated for that file with the corresponding bits set to one, resulting in the following new bit string:

0000 1010 0101 0000

The facility uses this bit string to update the bloom filter aggregate by OR-ing the bit string generated for the new file with the current owner bloom filter aggregate, resulting in the following bit string:

0010 1010 0111 0100

This bit string is OR-ed with each of the "owner bloom filter aggregates" in the ancestor folders to update their corresponding "owner bloom filter aggregates." In response to a query for a particular owner or owners, the facility applies the same hash functions to the owner or owners to produce a query bit string. If all of the corresponding bits in the bloom filter aggregate are equal to 1 (i.e., if the result of AND-ing the query bit string with the "owner bloom filter aggregate" is the query bit string), then there is a chance that the folder (or one of its subfolders) includes a file owned by the particular owner or owners. Otherwise, neither the folder nor its subfolders includes a file owned by the particular owner or owners and, therefore, these folders are skipped as part of the search. Additional information regarding Bloom filters can be found in Bloom, Burton H. "Space/Time Trade-Offs in Hash Coding with Allowable Errors," *Communications of the ACM* 13, pp. 422-426 (1970), which is incorporated herein by reference in its entirety.

In some embodiments, the facility employs queryable user tags to allow users to define their own attributes or metadata for files and folders and, therefore, define a custom set of files and/or folders. A user may define a user tag that leverages information maintained by the computing system or operating system. For example, a user may define a "larger than 5 MB" tag that, if set to 1, specifies that the file is larger than 5 MB, and a "created after Mar. 1, 2013" tag that, if set to 1, specifies that the file was created after Mar. 1, 2013. A user may define a tag that using information that is not otherwise available to the computing system or operating system, such as all files that a particular user has expressed an interest (e.g., "files liked by Bob"). For each file, the facility applies these user-generated tags by, for example, appending the tags to the file or a metadata field of the file, and then aggregates these values into an aggregate tag for each folder by, for example, OR-ing all of the tags for each file and subfolder within that folder. Thus, if the user is searching for files greater than 5 MB, the "larger than 5 MB" tag aggregate can be used to determine whether a particular folder contains one or more such files. In this manner, the facility improves the speed and efficiency with which a computing system identifies files relevant to a query, such as a user-generated search. Moreover, in some embodiments, the queryable user tags are indexed to further reduce the amount of time and memory required to identify files that satisfy a query. In some embodiments these user-defined tags are added to individual files or folders as metadata. In some embodiments, the facility maintains query tags that are larger than a bit.

In some embodiments, the facility maintains a moving average aggregate for a folder that signifies changes in diskspace usage over time. For example, in some embodiments the moving average aggregate is used to approximate how much data has been written to or removed from a particular folder during the previous hour, day, week, and so on. The moving average aggregate allows a user to determine how quickly diskspace usage is changing and where those changes are occurring or have occurred. The facility maintains a moving average aggregate for a folder by storing, for each file, the time at which the file was stored in that folder and then applying a decay function (e.g., an exponential decay function) to the size of the file based on when the moving average aggregate is being calculated.

In some embodiments, the facility maintains aggregate values within b-trees. A b-tree is a tree data structure commonly used in databases and filesystems to organize and store information. A b-tree provides techniques for searching, inserting, deleting, and otherwise accessing information stored within a filesystem. Additional information regarding b-trees can be found in Comer, Douglas, "The Ubiquitous B-Tree," *Computing Surveys* 11 (2), pp. 123-137 (June 1979), which is incorporated herein by reference in its entirety. As with filesystem subtrees and directories, the facility maintains aggregate values for b-trees by storing, in each non-leaf node aggregate values generated from that non-leaf node's children. In some embodiments, the facility uses a btree to structure the data for one or more nodes within a filesystem tree, wherein a leaf can represent a file, symlink, block device, character device, unix domain socket, named pipe, etc.

In some embodiments, certain aggregates are invertible while other aggregates are non-invertible. An invertible aggregate is one that can be updated without re-scanning the folder (and its subfolders) to update the aggregate for the folder and/or the aggregates of its ancestor folders. For example, an aggregate checksum generated using the XOR operator can be updated when a file is removed (or added) by XOR-ing the aggregate checksum with the checksum for the file. In contrast, non-invertible aggregates, such as min/max aggregates, bloom filter aggregates, sameness bits, user tags, and so on are updated by scanning the contents of a corresponding node or directory (and its subdirectories). For example, when the largest file in a directory is deleted, then the facility must search for another file (or aggregate value of a subfolder) to update a MAX filesize aggregate.

When a metric request from a client is received for data stored by the facility, the request is eventually received at a node within the cluster. For example, the request may be received through a REST_API 302 on a REST server (not shown), which is interfaced with the local filesystem 308. The facility retrieves the requested data, such as a metric value, from a particular disc 315 on a node, provided at the address (312) reference by the filesystem 308, and then returns the requested data to the client. In some embodiments, individual metric values for a single filesystem object may be returned. When a request is received for a directory having child directories, all metric values for the entire subtree defined by the directory are returned in response to a single request from a client in some embodiments. The client can parse the values in the response message in order to identify and display a specific metric value for a particular filesystem object to the user. In various embodiments, the response message is formatted in JavaScript Object Notation (JSON), extensible markup language (XML), or other data exchange language.

In some embodiments, the initial request call (e.g., GET, PUT, POST, DELETE) from a client may include a plurality of parameters for the value of the metrics in the response. For example, in one parameter the client is able to indicate a maximum number of "directory entries" to return for a filesystem object. The directory entries may include metric values for the directory and any descendant directories or files, such as those within a subtree defined by the directory. The returned values may include aggregate values for the directory as well as any descendant directories. In another parameter, the client is able to provide an order to sort the returned directory entries for the directory. The order may be based on a retrieved metric value determined by aggregating an attribute of one or more files contained by the directory and any descendant directories. For example, the client may select to sort the returned directory entries based on the storage capacity used (e.g., the number of blocks in the facility) by that filesystem object and descendent objects. This parameter mainly pertains to sorting the directory entries corresponding to descendant directories of the requested directory since the requested directory includes the aggregate value of blocks used by each returned directory entry.

Figure 4:
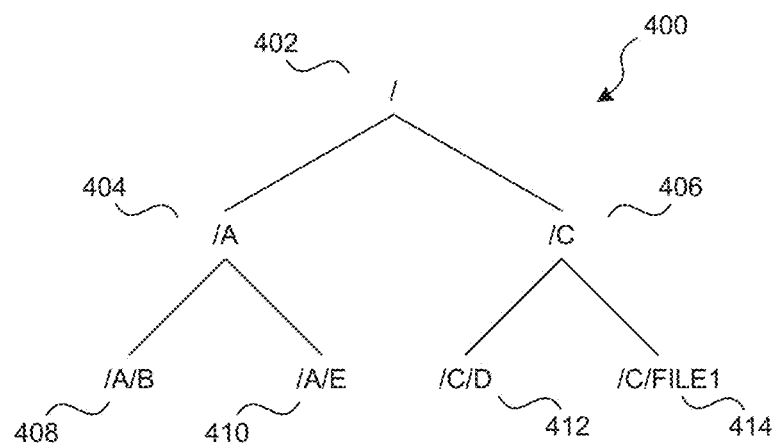
FIG. 4 shows a sample filesystem tree of filesystem objects.

FIG. 4 is a hierarchical tree-structure 400 representative of hierarchical data storage in the facility. The tree 400 includes filesystem objects 402, 404, 406, 408, 410, 412, and 414, including a root directory 402. As previously mentioned, a filesystem object can be a directory or a file. Each filesystem object 402, 404, 406, 408, 410, 412, and 414, in a tree typically stores and maintains a relatively current version of attributes and metadata for that filesystem object.

In particular, each filesystem object that is a directory 402, 404, 406, 408, 410, and 412 contains metadata and other data unique to the directory which characterizes files in that directory. The other unique data includes metric values of aggregated attributes for each file in, or "contained" by, the directory, along with information viable to access the contents of each of those files.

Each filesystem object that is a file 414 in the filesystem tree also contains metadata and one or more attributes characterizing that file, which may be aggregated and stored as a metric value in the directory under which that file is located in the filesystem tree. The metadata, aggregated values and other attributes may be stored in an inode portion of the filesystem object, which is later discussed with reference to FIG. 5. In some embodiments, the aggregated values for an individual file are stored in the directory entry pointing to that file. In some cases this is useful, for example, to accelerate operations that parse aggregate values for each entry in a directory.

Figure 5:
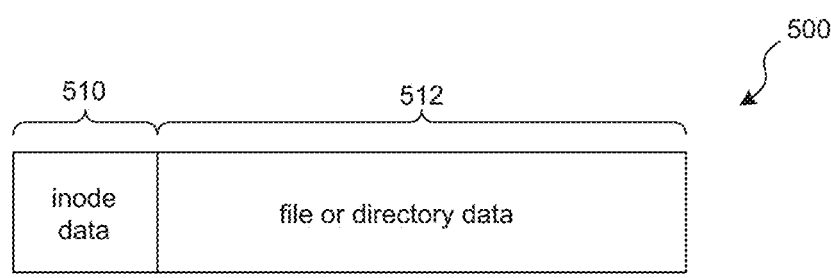
FIG. 5 shows a representative view of the contents of a filesystem object.

FIG. 5 illustrates an example linear view of the contents stored in a filesystem object 500. The filesystem object 500 can be stored in a data structure and can be of variable size. Each filesystem object 500 in the facility includes inode data 510 stored in one or more blocks at a particular filesystem location and file or directory data 512 stored at a corresponding filesystem location. Though the inode data is described as being stored both adjacent to and separate from the corresponding file or directory data 512, this inode data can be stored in association with any directory or file in any on-disc format and in any type of filesystem. In some embodiments, for filesystem objects that are directories, the directory data 512 contains a directory map data structure identifying each filesystem object contained by the directory by its name and inode number. For filesystem objects that are files, the file data 512 contains an extent list data structure identifying the disc blocks containing the file contents by the filesystem addresses usable to locate those blocks. In some embodiments, the facility also maintains a global data structure for mapping inode numbers from each inode in the filesystem tree to the filesystem location at which the corresponding inode data is stored. In some embodiments, the facility may store a copy of this global data structure on each node (e.g., in FIG. 2).

For filesystem objects which are directories, the inode data 510 includes both the attributes of the associated directory and current metric values of aggregated attributes for each filesystem object contained by that directory. For example, the inode portion of a directory corresponding to the directory's attributes includes data such as an owner, permissions, number of links to the directory, the size of the directory in bytes or blocks (my_cap_usage), file count in the associated directory (my_num_files), most recent access time (atime), minimum access time, number of times accessed, creation time, modification time, and change (edit) time. The inode portion of the directory corresponding to the aggregate metric values includes data such as, for example, total number of files in and contained by the directory (num_files), total block usage by the directory and files contained by that directory (capacity_usage), total number of directories contained by the directory (num_directories), and various other metrics within the scope of the art. In some embodiments, the inode data also includes metric values corresponding to the Input/Output (I/O) operations performed on the associated directory (or any filesystem object contained therein) and the resource consumption to perform those operations. In some embodiments, the operations include a number of accesses, number of disk actions for accesses, number of memory accesses for accesses, and number of blocks consumed.

For filesystem objects which are files, the inode data 510 may indicate file attributes such as a last access date (file_access), a name (file_name), a type (file_type), and a size (file_size). The file access time may include a date and/or timestamp indicating the last time the file was accessed by a client. The file type may indicate the format in which the file is stored. The file size may indicate the number of bytes, kilobytes or data blocks used to store the file.

The aggregate metrics stored in the inode data for each filesystem object reflect a current state of the files or file contained by that filesystem object, including the corresponding attributes of those files. The aggregate metrics stored in the inode data for each directory also include aggregated values for file attributes of each file contained by that directory. Accordingly, each time that a file contained by a directory or descendant directory of that directory changes, the aggregate metrics in the inode data of the directory are also timely updated to reflect those changes. For example, to reflect the current state of attributes for files contained in a directory of a filesystem tree, the metric values stored in the inode data may be updated (i.e., reconciled) each time that an change is made to a file in that filesystem tree. Accordingly, there are times when updates to one directory or file may not be immediately reflected in all of that directory or file's ancestors. If the updates have not been applied to a particular ancestor directory, the unreconciled data for that directory is reflected in a descendant filesystem object from where the change originated. If the updates have been applied to that directory, an unreconciled value and reconciled value in the descendant filesystem object from where the change originated can reflect it. For example, in some embodiments, if the unreconciled value and reconciled value are equal, this indicates that the metric values in the parent directory's inode data fully reflect the filesystem object's metrics. Maintaining knowledge of whether the attributes for a filesystem object are current or not can provide additional visibility into that filesystem tree. Accordingly, a reconciled value and an unreconciled value corresponding to each attribute in a directory may be stored in the inode data. In some embodiments, the metric values for any given directory are not returned to a client if a descendant directory indicates that there is unreconciled data requiring an update in that directory.

Each change or update to an individual file in a filesystem tree is reflected in the changes to the attributes stored in the inode data of that filesystem object and in any ancestor directories with which that filesystem object may be associated. This updating may be performed up the filesystem tree until the metric values corresponding to the changed attribute stored in the root directory's inode data are updated. In some embodiments, the facility asynchronously updates each filesystem object with respect to a received change or alteration to a file stored in the filesystem tree. In some embodiments, the facility systematically traverses the filesystem tree to update each filesystem object. In some such embodiments, the facility continuously updates filesystem objects in a filesystem tree to reflect changes to any file or directory contained in that filesystem tree. As previously mentioned, in some embodiments, the filesystem objects in the filesystem tree are synchronously updated with respect to received changes or alterations to files stored in those filesystem trees. So, updates to filesystem objects in the facility may only be performed each time a change to a filesystem object is received for that respective tree. Various other methods for determining when to update filesystem objects and corresponding inode data stored in those filesystem objects are further discussed with reference to FIGS. 6-7D.

In some embodiments, the inode data 510 includes a value of a metric unreconciled to a parent directory, such as an unreconciled to parent block count and reconciled to parent block count which, when equal, indicate that all updates to the parent directory containing that filesystem object are current.

For example, if an attribute of a file (e.g., file_size) is updated in response to changes made to that file, then the updated file_size attribute will also need to be reflected in the metric corresponding to that file_size attribute in the parent directory and in any ancestor directory of that file. To indicate when the updated attribute is not yet reflected in the corresponding metric of the parent directory, a value of the metric unreconciled in the parent directory indicates a different value than the metric reconciled to parent directory. Each attribute of the file for which a metric value is stored in a parent directory can maintain these unreconciled to parent and reconciled to parent values. When these values differ, it indicates to the facility that the parent directory of that file needs to be updated by the difference between the values during a subsequent I/O operation.

In some embodiments, the facility maintains a separate "list" of filesystem objects having unreconciled data in a filesystem tree instead of, or in addition to, indicating the value of the unreconciled to parent data in the inode data of each filesystem object. In some embodiments, the facility maintains this separate list in volatile memory. Maintaining this list and performing a reconciliation process due to block count, or other attribute changes in a filesystem object, are further discussed with reference to FIGS. 7A-7E.

Referring back to FIG. 5, in some embodiments, the inode data and the second portion of the filesystem object data can be stored at specific location in a block storage unit used to store the filesystem object. For example, in some embodiments, the facility can store a pointer to that specified storage location to obtain the requested data. The filesystem object data includes data such as the payload or actual file data for that filesystem object. For example, in a directory, the data may include information pertaining to the files contained by that directory, such as the file paths and paths to any child directories. Accordingly, the directory data includes information for each file accessible via that directory and the location of the file. Each file contained by a directory may be included in various other directories in the facility as well. For example, as shown in FIG. 4, directory /A 404 defines a subtree made up of directories /A 404, /B 408, /E 410, each of which may contain various data files. The filesystem object for directory /A 404 therefore may store inode data having aggregated values for each of the files contained by /A, /B, and /E, and directory data including paths for each of those files. Any additional file-related or directory-related data within the scope of the present disclosure may also be stored in the second portion of the filesystem object.

Figure 6:
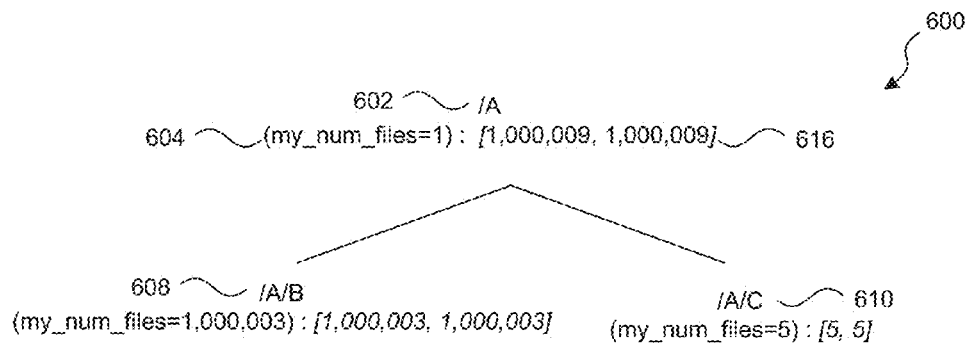
FIG. 6 shows a tree structure indicating a size attribute for a filesystem object and an aggregate size metric value for the filesystem object and descendent filesystem objects in a subtree of the filesystem object.

FIG. 6 illustrates an example subtree 600 of filesystem objects including at least one attribute and associated metric value for each filesystem object in that subtree. The subtree is defined by a directory /A 602. The subtree 600 may be located in a larger filesystem tree structure, such as the filesystem tree 400 shown in FIG. 4, which is defined by the root directory "/" 402. In the illustrated embodiments of FIG. 6, each filesystem object includes three values. The my_num_files 604 value of "1" in directory /A 602, is an attribute indicating a number of files contained by that particular directory (local file count). The second two values, represented in an ordered pair 616, indicate a reconciled and an unreconciled metric value [reconciled, unreconciled] for that attribute (num_files) in a parent directory (e.g., "/" in FIG. 4) of directory /A 602. In the ordered pair 616, the right value is a value of that metric that is unreconciled in the parent directory [1,000,009, 1,000,009] and the left value is a value of the metric that is reconciled in the parent directory [1,000,009, 1,000,009]. This ordered pair indicates whether the metric value in the parent of the filesystem object (e.g., directory /A 602) fully reflects any updates to that attribute (num_files) in any descendant filesystem object. In FIG. 6, since both metric values 616 in the ordered pair are equal, the corresponding metric in the parent directory (e.g., "/" in FIG. 4) fully reflects the updated metric value.

In FIG. 6, the num_file metric value is a hierarchical aggregate of the number of files (num_files) contained by each descendant directory (e.g., /B 608, /C 610) of that directory (/A 602) and any files directly contained by the directory itself (aggregate file count). For example, in the illustrated embodiment, a metric value (not shown) for the num_files attribute in directory /A 602 is "1,000,009". This metric value includes the aggregate values of my_num_files in each descendant directory (e.g., "1,000,003" for /B 608, "5" for /C 610), which include the aggregate values of any descendant files (e.g., FILE1, FILE2, etc.) in those descendant directories. The metric value in directory /A 602 also includes any local files, e.g., "1" 604, contained by the directory /A 602 itself for which that metric value is calculated. Accordingly, when a client requests a metric value for an attribute of a directory in a filesystem tree, which defines a subtree, that value reflects an aggregation of the attributes in any descendant directory plus the attributes of the directory on which the aggregation is performed.

For a large filesystem tree structure including many directories, performing an aggregation operation on all filesystem objects in that filesystem tree can consume considerable processing resources and elapsed time to determine a metric value for a given directory. However, as previously discussed, these additional metrics that include aggregate values of file attributes, are stored in the inode data for each directory. The inode data may be updated each time a filesystem object is updated. This inode data maintains a relatively accurate indication of the attributes for a given directory, even if recent changes to one or more files in that directory are not yet reflected. Accordingly, this allows for rapid and easy access to current filesystem attributes, which may facilitate performance and allocation of resources in both large and scalable filesystems FIGS. 7A-7E illustrate at least one method for updating attributes and associated metric values in filesystem objects of a filesystem tree. The method tracks each filesystem object to which a change is applied in a file path from the updated file to the root directory. To implement such tracking, each modified filesystem object may be added to a set of unreconciled filesystem objects, one or more of which is iteratively updated in the tree during a subsequent operation. For example, the set 722 may be a list of unreconciled filesystem objects maintained in a filesystem tree. Accordingly, the set 722 of filesystem objects may include both files and directories whose attributes have been changed, but not yet updated to reflect the change, and which may require an update in an ancestor filesystem object.

Figure 7A:
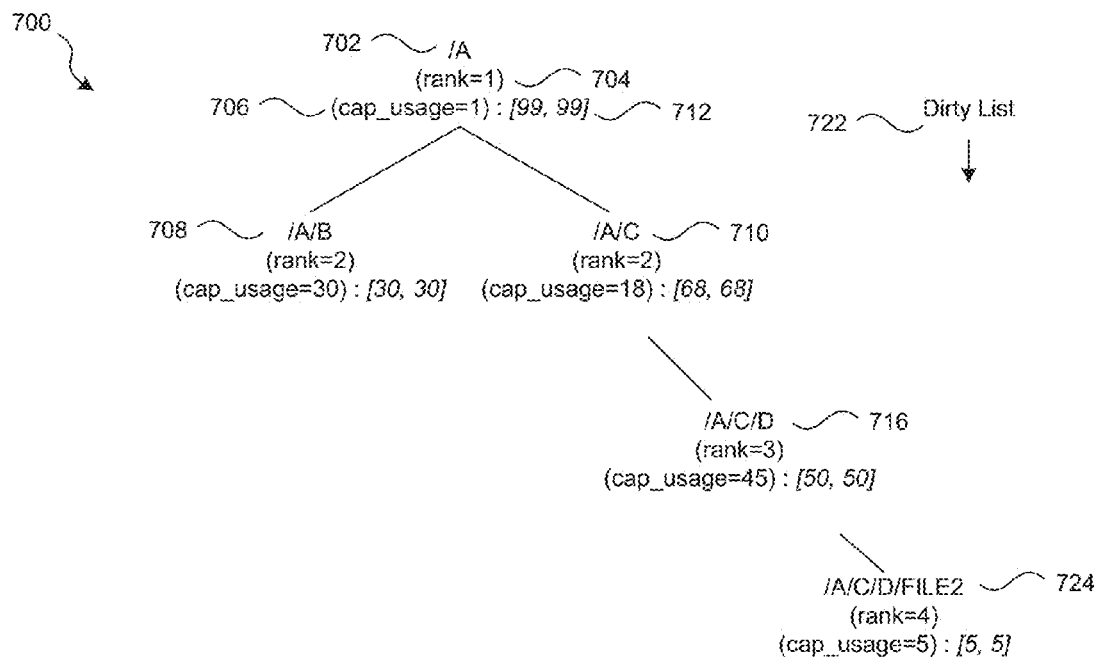
FIG. 7A shows a tree structure indicating rank attributes, capacity usage (cap_usage) attributes and corresponding reconciled and unreconciled to parent metric values for each directory in that tree.

FIG. 7A is example of a tree structure for data stored in a filesystem, such as for directory /A shown in FIG. 6. The filesystem tree 700 includes a directory /A 702 and various descendant directories /B 708, /C 710, and /D 716, and a file FILE2 724 of the directory /A 702. The directories and file also indicate two attributes that the facility maintains in the inode data stored in each filesystem object, which is either a directory or a file. For example, in directory /A 702, the two attributes include a rank 704 and a capacity usage (cap_usage) 706. The rank indicates a level of the filesystem tree in which the filesystem object is located. For example, the directory /A 704 indicates "rank=1" since it is at the top of the tree hierarchy (and, a first descendant of the root directory "/" in FIG. 6). The filesystem object's capacity usage 706 identifies a number of blocks used by a particular filesystem object as discussed with reference to FIG. 3. In FIG. 7A, directory /A 702 has a cap_usage of "1", though the aggregate cap_usage of the sub-tree defined by directory /A 702 has a cap_usage of "99" (i.e., 5 (FILE2)+45 (/D)+18 (/C)+30 (/B)+1(/A)=99). Though the rank and cap_usage are attributes used in the updating process of the following description, it is understood that various additional attributes are considered and either or both the rank and cap_usage are not required attributes within the facility.

The filesystem tree in each of FIGS. 7A-7E also indicate an ordered pair [reconciled, unreconciled] 712 providing the value of the cap_usage metric for the reconciled to parent block count and the unreconciled to parent block count in each filesystem object in that tree 700. These values 712 indicate whether changes to the block count value in each filesystem object have been updated (e.g., are current) in the parent directory of that respective filesystem object. Accordingly, in some embodiments, if all updates have been reconciled to a parent directory of a given filesystem object, the reconciled cap_usage and unreconciled cap_usage ordered pair 712 are equal. FIG. 7A illustrates such an embodiment since the aggregate block count in the ordered pair 712 is equal [99, 99].

Figure 7B:
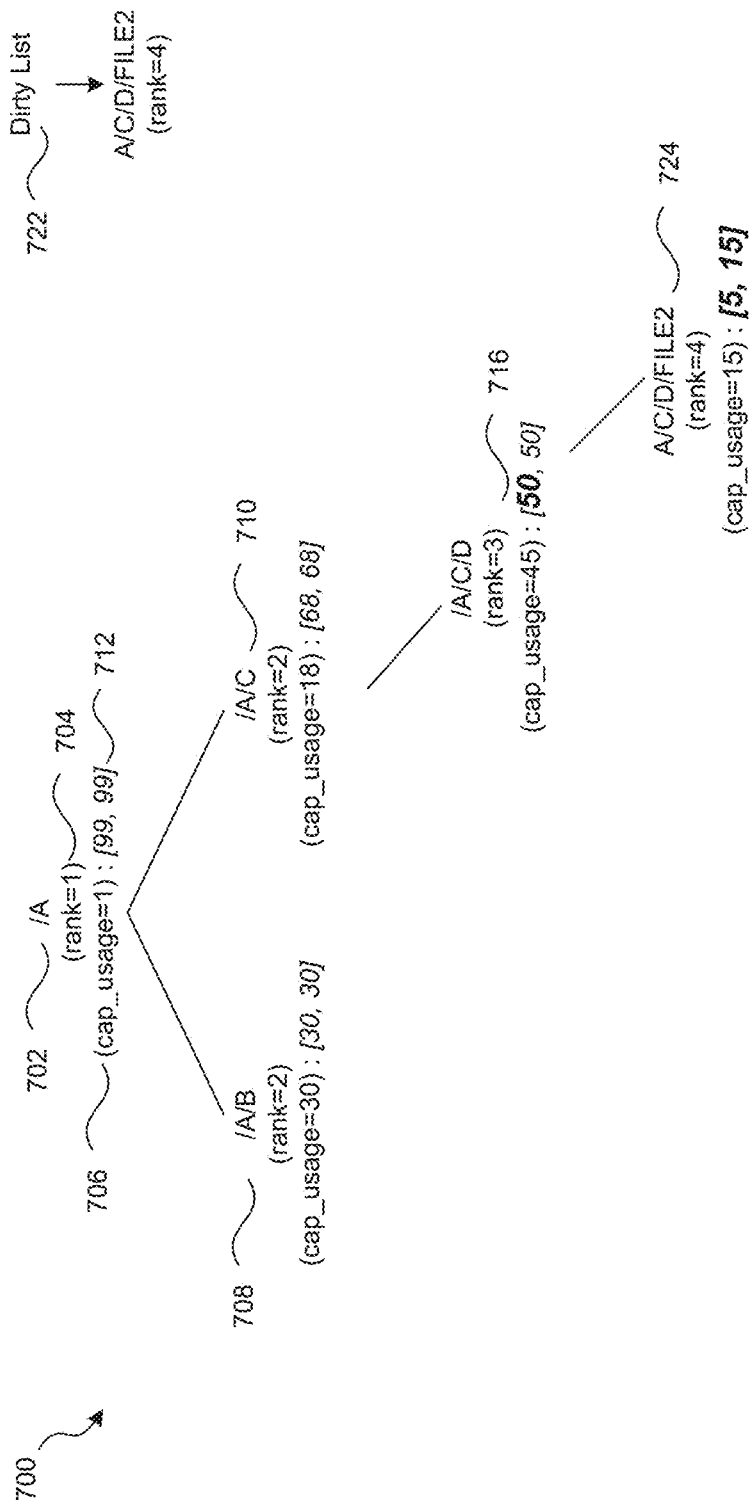
FIGS. 7B-7E shows the tree structure of FIG. 7A and a dirty list for updating the reconciled and unreconciled to parent metric values in each directory of the tree.

FIG. 7B illustrates the filesystem tree 700 after changes are made to FILE2 724 in directory /D 716. When the changes are made to a file, in some embodiments, the changes are immediately reflected in the attribute values stored among the inode data for that filesystem object. Accordingly, FILE2 724 reflects an updated cap_usage of "15". However, FILE2 724 is still considered "unreconciled" since the changes to that file still need to be reflected in the directory data and the attributes stored in the inode data of the directory /D 716 which contains FILE2 724. As a result, FILE2 724 is then added to a separate file for a set 722 of "dirty" filesystem objects. The set 722 tracks the filesystem objects requiring an update to reflect changed attributes of a changed file (e.g., FILE2) in that directory (e.g., /D). A "dirty" filesystem object is also indicated in reconciled and unreconciled values (e.g., FILE2 724) that provide differing numbers (e.g., [5, 15]) for reconciled and unreconciled block counts in its parent directory /D 716.

Figure 7C:
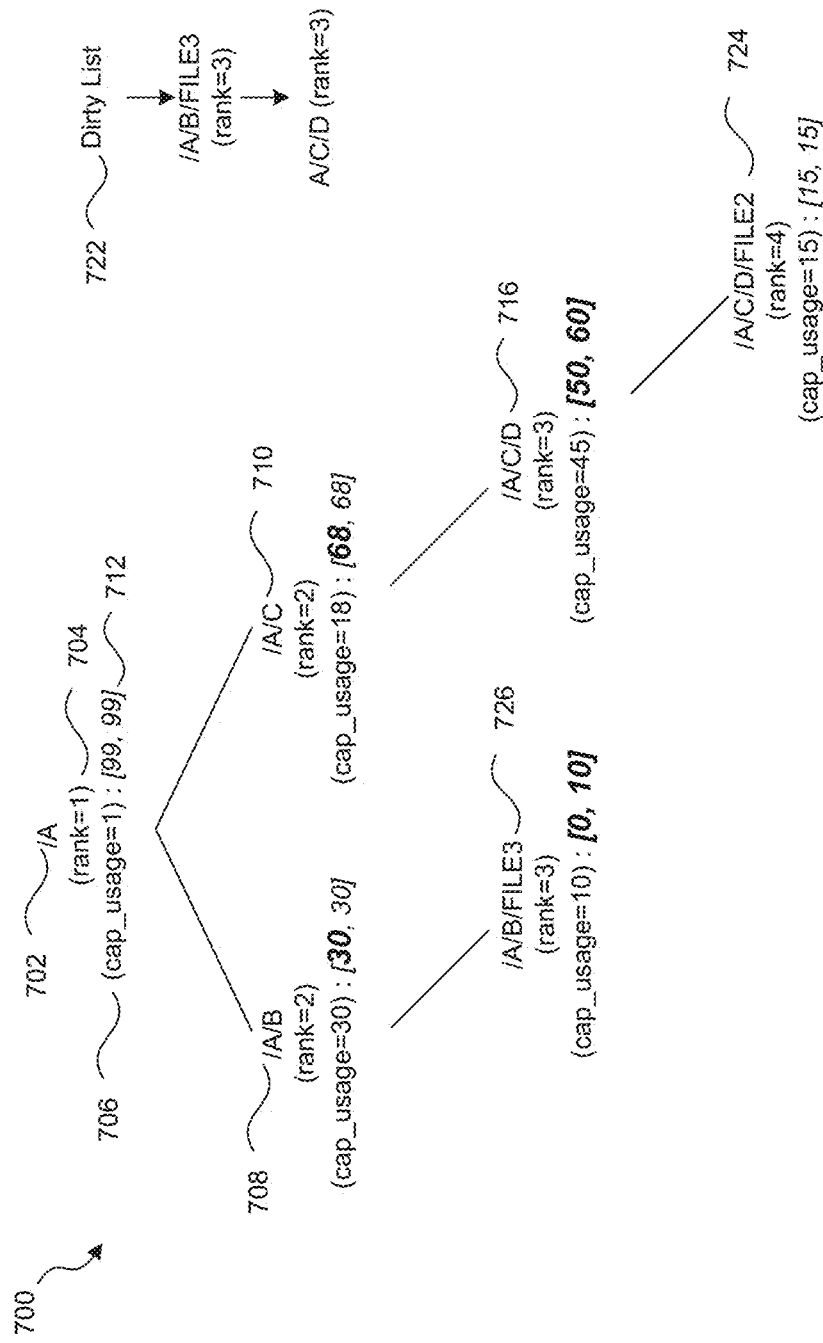

Once the corresponding metrics in the inode data for FILE2 724 have been updated in directory /D 716, the next associated ancestor filesystem object in the file path from FILE2 724 to the root directory (not shown), is added to the set 722 of dirty filesystem objects being tracked for updating. So, after reconciliation is performed in FIG. 7B, the next filesystem object added to the set 722 is directory /D 712 (shown in FIG. 7C). This is because the new value of the cap_usage attribute may alter at least one metric value of the aggregated attributes stored in the inode data of the parent directory /C 710, which contains directory /D 716 (and FILE2 722). Additionally, the reconciled and unreconciled block counts in FILE2 724 are then updated [15, 15] to reflect the reconciled updates to the aggregate metrics in directory /D 716. The reconciled and unreconciled counts in directory /D 716 are also updated to reflect the unreconciled blocks [50, 60] in its parent directory (/C 710) as illustrated in FIG. 7C.

In various embodiments, the facility stores the set 722 of dirty filesystem objects either as persistent data (on-disk) or volatile data (in-memory), each of which has its advantages and disadvantages. For example, where the set 722 stored in persistent storage, no initial inode scan is necessary at startup, but updates to each filesystem object are slower than when the set 722 is maintained in volatile storage. Where the set 722 is stored in volatile storage, normal operations are performed faster, but an initial inode scan is required at startup.

In some embodiments, if more than one filesystem object is located in the set 722, the filesystem object having the lowest rank (e.g., farthest file path length from the root directory) in the filesystem tree may be updated first such that its attributes indicate the updated cap_usage value. This ensures that all updates to filesystem objects in the filesystem tree are not repeated, which improves the efficiency of the facility. The filesystem objects within the set 722 of filesystem objects to be updated may be reconciled in an iterative process. Additionally, the filesystem objects in the set 722 may be sorted in order to remove duplicates and to update entries having the lowest rank first. This is done in order to avoid unnecessary and repeated updates to a filesystem object whose descendent also is included in the set 722.

As discussed previously, any updates to a filesystem object may be reflected in hierarchical aggregates indicated by the metric values stored in the inode data for each filesystem object. Once a filesystem object is updated, the filesystem object's entry in the set 722 is removed and the filesystem object's parent directory is added to the set 722. Additionally, the reconciled and unreconciled values for that attribute are updated to reflect the unreconciled data in that filesystem object's parent directory. The metric values indicated in each filesystem object may be updated in a direct path of the directories from the updated file to the root directory. Thus, only the filesystem objects in the path of the file to the root directory need be updated. Unaffected filesystem objects and subtrees are therefore not traversed or updated. So, system resource consumption may be reduced, relative to the time required for iterative scans of the full filesystem tree, and metric values of filesystem object attributes may be updated more quickly since system resources are not allocated to perform unnecessary tasks.

In some embodiments, where the facility receives a request for metric values in a "dirty" filesystem object (i.e., in set 722, or a descendant thereof in set 722), the facility updates only the filesystem object (and any descendants) in the set 722 prior to servicing the request. In some embodiments, the facility updates all filesystem objects in the set 722 prior to servicing a request by a user. In such embodiments, the facility can ensure the most up-to-date metrics for the request. To alternatively determine whether a filesystem object (or descendant thereof) is not completely current, the facility can also check the reconciled and unreconciled count for each descendant of that filesystem object. If any counts differ, the facility can then either update each of the descendants to the requested filesystem object prior to servicing the request, or update the entire tree to the root directory, as previously mentioned, FIG. 7C illustrates the filesystem tree structure 700 in which the change to FILE2 716 is subsequently updated in the inode data associated with directory /C 710. This is indicated by the differing reconciled and unreconciled values [50, 60] of the ordered pair in directory /D 716, which signify that only fifty blocks are currently reconciled in directory /C and sixty blocks need to be reconciled to make the metric values stored in directory /C current. The reconciled value "68" in the ordered pair of its parent directory /C illustrates where the update is to be applied. Accordingly, the set 722 of filesystem objects reflects an entry of directory /D 710. The set 722 of filesystem objects also includes a newly added filesystem object, FILE3 726, for which the cap_usage of "10" needs to be updated in the cap_usage metric of its parent directory /B 708. Accordingly, FILE3 indicates reconciled and unreconciled ordered pair values of [0, 10] since 10 blocks need to be added to the reconciled block count (i.e., "30") in directory /B 708 to make that directory's aggregate attributes current.

As shown in FIG. 7C, directory /D 716 and FILE3 726 may concurrently be processed during the next iteration since both have a rank of "3". In some embodiments, each iteration, or processing of filesystem objects in the set 722 of filesystem objects, removes filesystem objects on corresponding levels (e.g., "rank" in FIG. 7C) of the filesystem tree structure. In other embodiments, each filesystem object in the set 722 may be processed and updated sequentially, based on the order in which that filesystem object is placed in the set 722. In the aforementioned embodiment, one or more entries in the set is processed during each iteration.

Figure 7D:
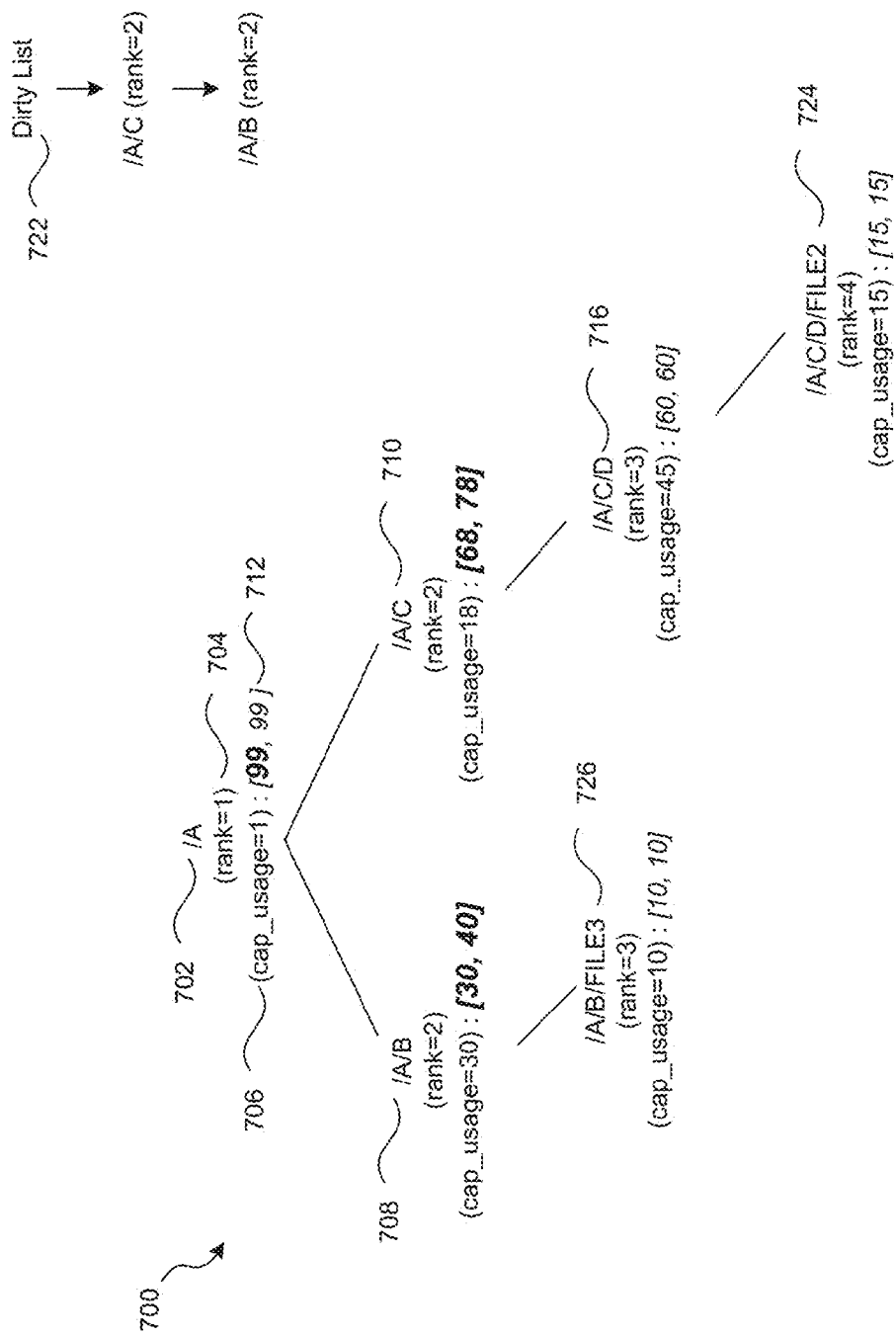

FIG. 7D illustrates a tree structure 700 in which directory /D 716 and FILE3 726 reflect the updates processed during the iteration performed in FIG. 7C. Accordingly, the cap_usage aggregate attribute in the inode data for directory /B 708 now reflects an updated unreconciled to parent metric value of "40" in the ordered pair values [30, 40] in that directory. Similarly, directory /C 710 now reflects an unreconciled value of "78" in the ordered pair [68, 78]. These unreconciled values both reflect unreconciled cap_usage metrics in the common parent directory /A 702 as well as indicate those directories as being "dirty". So, these parent directories (/C and /B) in the direct path of the processed filesystem objects (/D and FILE3) are added to the set 722 of filesystem objects to be updated. The set 722 then includes directories /B 708 and /C 710, which are concurrently processed during the next iteration because both are rank "2" in the filesystem tree 700. The reconciled and unreconciled values in FILE3 726 and directory /D 716 are also updated to indicate updates applied to their respective parent directories and those filesystem objects are then removed from the set 722 of filesystem objects.

Figure 7E:
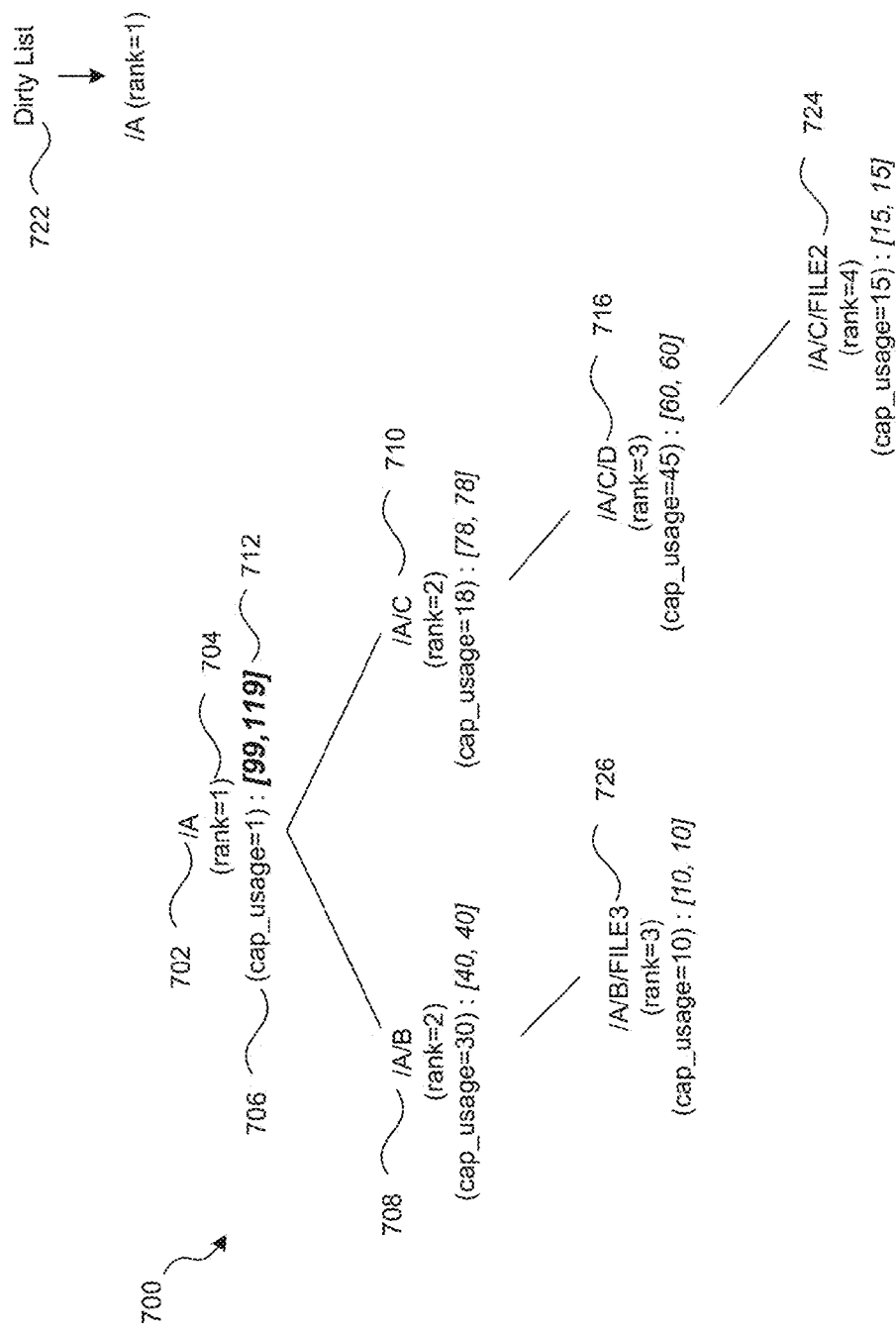

Once directories /B 708 and /C 710 are processed, as illustrated in FIG. 7E, directory /A is then added to the set 722 of dirty filesystem objects. Since that directory is the parent directory for both /B 708 and /C 710, the duplicate entry is removed in order to prevent unnecessary processing of directory /A on the next iteration. The reconciled to parent and unreconciled parent values 712 for directory /A 702 are also updated to reflect an unreconciled cap-usage value (99, 119) in its parent directory (not shown). The reconciled and unreconciled values in directories /B 708 [40, 40] and /C 710 [78, 78] can also be updated to indicate an updated aggregate metric value in the parent directory (/A). Once directory /A 702 has been processed in a similar manner during the next iteration, directory /A 702 will be removed from the set 722 and the value for that filesystem object attribute will also be updated to "119". Accordingly, the ordered pair will be [119, 119].

An alternative approach to update the aggregate metric value in, for example, directory /A 702 (in FIG. 7D), is to take the difference between the reconciled and unreconciled values for cap_usage in both directories /B 708 and /C710, sum (e.g., sum ()) those differences, and add that sum to the cap_usage metric value stored in directory /A 702. For example, in directory /B 708 the difference [30, 40] is "10" and in directory /C 710 the difference [68, 78] is "10". So, "20" is the sum of those differences, which is then added to a prior stored, or reconciled value ("99") for cap_usage in directory /A 702. If during this update a change occurred to a lower ranking filesystem object in the filesystem tree (e.g., /D 716), prior to processing the update on directory /A 702, then directory /A 702 would remain in the set of filesystem objects 722 until directory /D 716 is processed. Each lower ranking filesystem object (e.g., from /D up) will then be processed in a similar manner described above, prior to directory /A 702. This prevents additional processing on directory /A 702, such that all updates on that directory may be processed in the same iteration and reflect the most current update to cap_usage (or other attribute) in the inode data of that directory.

Accordingly, in some embodiments, the facility updates a directory's aggregated metric value for a specific attribute by summing a difference between the reconciled and unreconciled values in a child directory with the metric value previously stored in that directory. In another example, referring back to FIG. 7B, each directory and file maintains a count of [reconciled, unreconciled] data to facilitate aggregation of filesystem object attributes. The difference between the unreconciled data in directory /D is equal to "10" (reconciled=50, unreconciled=60). So, to determine the metric value for that attribute of cap_usage in directory INC, the filesystem simply sums "68" plus the difference "10" to perform the aggregation. This value can be verified, or alternatively determined, by recalculating values of all entries in directory /C to generate a new aggregate value.

Though the aforementioned embodiments maintain a separate list (e.g., the set of filesystem objects 722) to update metrics in the facility, the metrics can be updated by other methods which do not include such a list or associated filesystem object ranks. For example, in some embodiments, the facility ensures the currency of all of the metrics in the entire filesystem tree each time a filesystem object is updated. In effect, each time a filesystem object is updated, the system traverses the filesystem tree in which that filesystem object is stored to the root directory and updates the metrics in each directory of the direct path from the filesystem object location in the filesystem tree until the root directory is updated to also reflect the update. In some embodiments, an asynchronous, or background process continually traverses trees accumulating and updating metric values for file attributes in the filesystem objects.

To handle filesystem object updates such as deletion of a file or directory from a filesystem tree, the reconciled and unreconciled data for each ancestor directory can be updated in a similar manner as previously described with reference to FIGS. 7A-7E. However, instead of adding the difference between the reconciled and unreconciled values in the filesystem object, the value of the deleted filesystem object is considered a negative unreconciled value in the parent directory associated with that filesystem object. Accordingly, the difference between the reconciled value in the deleted filesystem object and the unreconciled value in the parent is subtracted from the parent's reconciled value during a subsequent operation. Based on this adjustment, each directory in a path from the parent of the deleted filesystem object to the root is ultimately updated normally, such as through the process described in FIGS. 7A-7E (i.e., placing each filesystem object on a separate list 722). Furthermore, any unreconciled value in the deleted filesystem object is ignored since that filesystem object is being removed from the filesystem tree. To handle updates such as renaming a filesystem object, e.g., moving the filesystem object to another directory, the facility performs the aforementioned deletion process under the current name, and creates a new filesystem object under the new name, such as described in FIG. 7C with reference to FILE3. If the filesystem object had any unreconciled data, e.g., differing values in the ordered pair, the unreconciled value remains consistent throughout the deletion and creation process. The updating process for the unreconciled data then occurs normally (e.g., via the process in FIGS. 7A-7E) during a subsequent iteration on the renamed filesystem object.

For filesystem object attributes not having integer values, metric values can be updated by aggregation functions (e.g., latest( )) which compare a prior value of that respective value in each filesystem object being updated. For example, the attribute can include an raccess attribute identifying a most recent access date/time ("atime") of the filesystem object. The facility can compare the previous raccess date in a directory with an updated raccess date received from a descendant filesystem object, as opposed to looking at the raccess dates of all of the descendants in a subtree defined by that directory. For certain metrics and/or aggregation functions, a new aggregation can be performed across all filesystem objects in a tree or subtree in order to update metric values.

In some embodiments, the facility retrieves information about characteristics of a node, a cluster, or the entire filesystem from statistical sampling of a filesystem tree. The facility chooses the fraction of samples taken from files in each directory of the filesystem tree in such a way as to achieve a sample population that is appropriately distributed across the filesystem tree. In some embodiments, the facility determines the overall number of samples taken to satisfy a desired confidence level in the results.

Figure 8:
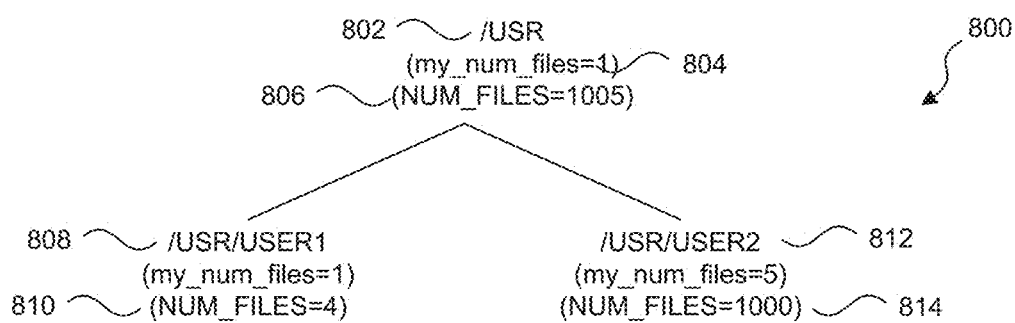
FIG. 8 shows a tree structure indicating weighted metadata for sampling.

FIG. 8 illustrates an unbalanced filesystem subtree 800 defined by a directory /USR 802, which has two child directories, directory /USER1 808 and directory /USER2 812. The shown subtree includes two file types, music 818 and other (non-music) data 822, specific to each of the child directories. In an example, the facility performs sampling using block count attribute (i.e., cap_usage) to answer the question, "what percentage of files stored in the subtree are music files?" Where the directory /USER1 808 includes only four data files 810, while the directory /USER2 812 includes one thousand music files 814. A simplistic even sampling performed on the root directory /USR 802 would result in a sample from each of the descendant directories 50% of the time. Accordingly, the sampling would result in a 50/50 split of music and data files in the root directory /USR 802. Since the file count attribute for each directory, /USER1 808 and /USER2 812, indicates that the root directory /USR 802 is not made up of 50% music files and 50% data files, these sampling results are clearly skewed and inaccurate. Thus, this approach to sampling may result in the erroneous conclusion regarding the makeup of a particular directory.

To avoid the aforementioned errors, the facility uses a fair sampling approach in which it uses the metric values stored in the inode data of the directories to weight these directories in the manner that determines the likelihood that each file sample gets taken from each directory. By weighting the directories in this way, the facility achieves an improved representative sampling of the composition of the data in the filesystem tree structure. Additionally, since any attribute of a filesystem object can be utilized to weight the directories, the representative sampling is improved for each individual filesystem attribute.

To perform fair sampling on the filesystem subtree 800, the facility uses, for example, a NUM_FILES attribute associated with each directory to establish sampling frequency weights for each directory of the filesystem tree. The NUM_FILES value is the total number of files associated with a directory summed with the files in all descendant directories. Using this NUM_FILES attribute therefore answers the question, "what percentage of files are music files?" So, the total number of files to be sampled between the two directories /USER1 808 and /USER2 812 for the root directory /USR 802 is 1004 since the NUM_FILES attribute 806 for the root directory indicates "1005" and the my_num_files attribute for the root directory indicates "1". By storing the aggregate file count in the inode data (e.g., 816, 820) of each directory, the system can quickly query those directories and determine that the files under directory /USER1 808 should be sampled "4" times out of every "1004" samples, or approximately 0.4% of the time, and the files under directory /USER2 812 should be sampled "1000" times out of every "1004" samples, or 99.6% of the time. If one hundred samples are taken in this manner, the sample results would indicate ~99% of the files are music files in the root directory /USR 802. This result is more accurate than the 50% music files calculated without using the metric values corresponding to the aggregated attributes of the files contained by the root directory /USR 802. This type of weighted sampling may be applied to any attribute of files within a filesystem tree in the facility and may facilitate improved visibility into the files contained by that tree. For example, weighted sampling may be used to determine a file size for two directories including unbalanced average file sizes, e.g., one includes .mp4 files and the other includes .doc files.

Figures 9A, 9B:
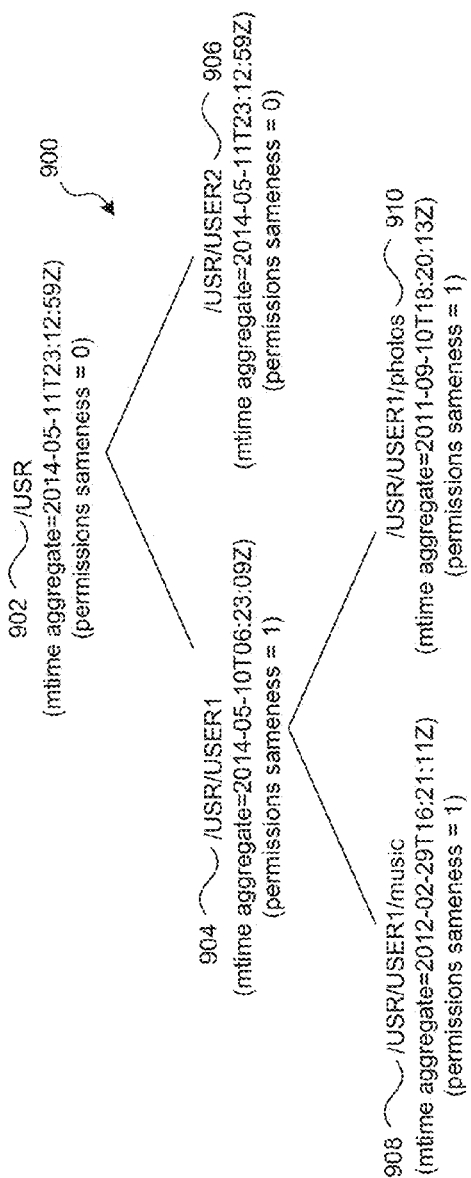
FIG. 9A illustrates a filesystem subtree 900 illustrating time-based aggregates and "sameness bits" in accordance with embodiments of the facility.
FIG. 9B is a table that includes a sample of files within the folders represented in subtree 900 and their corresponding mtimes and access permissions.

FIG. 9A illustrates a filesystem subtree 900 illustrating time-based aggregates and "sameness bits" in accordance with embodiments of the facility. In this example, aggregations of last modified times ("mtime") associated with files in the filesystem subtree 900 are shown. Subtree 900 includes five folders 902, 904, 906, 908, and 910. In an example, the facility generates an mtime aggregate for each folder by identifying, for each folder, the mtime for all of the files in that folder (and subfolders) and sets an mtime aggregate for that folder as the mtime of the most recently modified file in the folder or its subfolders. In this manner, the most-recently modified file determines the mtime aggregate for the folder storing that file and each folder above that folder in a directory tree. In this example, the file with the most recently modified file in subfolder 908 has an mtime of 2012-02-29T16:21:11Z and the most recently modified file in subfolder 910 has an mtime of 2011-09-10T18:20:13Z. The time-based aggregations enable efficient searching of files or folders that have time-based attributes within a specified range, including open-ended ranges. For example, if a user is searching for all files with an mtime after May 10, 2014, the facility can skip searching files and folders within folder 904 because its mtime aggregate is 2014-05-09T23:12:59Z, which is before May 10, 2014. In some embodiments, the facility stores aggregate MAX and MIN values for attributes, such as a MAX mtime aggregate and a MIN mtime aggregate. Thus, if the user is searching for all files with an mtime between Jan. 1, 2011 and Dec. 31, 2013, then the facility can use the MAX and MIN mtime aggregates to quickly determine whether a folder can be skipped (i.e., if the MIN mtime aggregate is greater than the upper bound of the range specified by the query or the MAX mtime aggregate is less than the lower bound of the range specified by the query). As another example, if the user is searching for the most recently-modified file(s), the computing system can skip folder 904 since its aggregate mtime is earlier than the aggregate mtime of folders 902 and 906. Thus, the computing system will find the most recently-modified file(s) in folder 902 and/or folder 906. In this manner, the facility improves the speed and efficiency with which a computing system can identify files relevant to a query, such as a user-generated search.

FIG. 9B is a table that includes a sample of files within the folders represented in subtree 900 and their corresponding mtimes and access permissions. For example, file /USR/file1 has an mtime of 2010-01-19T06:53:59Z while file /USR/USER1/photos/file2 has an mtime of 2011-09-10T18:20:13Z. The user permissions listed represent the access permissions for each of three classes: owner, group, and other. In this example, the access permission represents Unix permissions in an octal (base-8) notation. The access permissions for /USR/file2 and /USR/USER2/file1 are read, write, execute for the owner class and read-only for each of the other classes. The access permissions for each of the other files are read, write, execute for the owner class and read, execute for each of the other classes.

Figure 10:
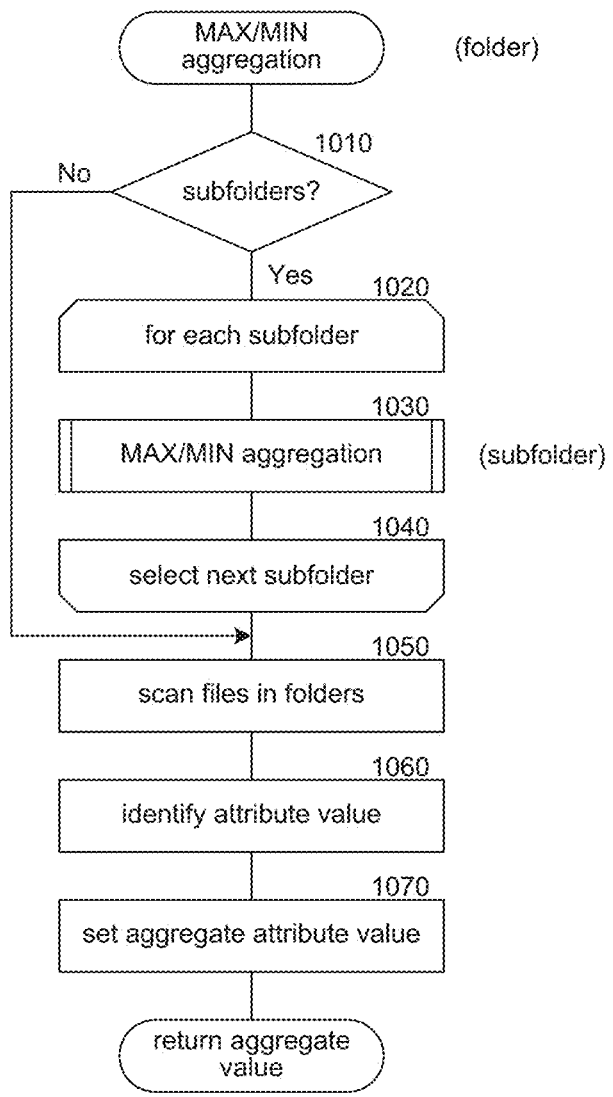
FIG. 10 is a flow diagram illustrating the processing of a max/min aggregation component in accordance with embodiments of the facility.

FIG. 10 is a flow diagram illustrating the processing of a max/min aggregation component in accordance with embodiments of the facility. The facility invokes the component to determine an aggregate value for a folder and the folders in its subtree. In this example, the component has been invoked to determine an mtime aggregate for folder 902. In decision block 1010, if the folder contains any subfolders then the component continues at block 1020, else the component continues at block 1050. In blocks 1020-1040, the component loops through each of the subfolders to determine aggregates for each subfolder. In block 1030, the component recursively invokes the max/min aggregation component for the currently-selected subfolder. For example, when processing folder 902, the component recursively invokes the max/min aggregation component for each of folders 904 and 906 (and 908 and 910 through its processing of folder 904). In block 1040, the component selects the next subfolder and then loops back to block 1020. If all of the subfolders have already been selected then the component continues at block 1050. In block 1050, the component scans all of the files in the folder to identify the file with the extreme attribute value for the aggregation. For example, if a MAX "last accessed" or "atime" attribute is being aggregated then the component identifies the file with the latest (most recent) atime attribute. As another example, if a MIN "date created" or "birthtime" is being aggregated then the component identifies the file with the earliest (oldest) birthtime. In block 1060, the component identifies the extreme attribute from among the identified file and the subfolders of the currently-selected folder. For example, the file with the most recently mtime within folder 904 has an mtime of 2014-05-10T06:23:09Z while its subfolders 908 and 910 have aggregate mtimes of 2012-02-29T16:21:11Z and 2011-09-10T18:20:13Z, respectively. Accordingly, the aggregate mtime value for folder 904 is 2014-05-10T06:23:09Z (i.e., most recent access for all files and subfolders within folder 904). The aggregate mtime for folder 902 is 2014-05-11T23:12:59Z, the most recent access for all files and subfolders within folder 902. In block 1070, the component sets the aggregate value for the currently-selected folder and then returns the aggregate value. While the above process is described in the context of a filesystem subtree (e.g., directory structure), one of ordinary skill in the art will recognize that this process can be applied to a variety of hierarchical structures, such as a b–tree, b+tree, b*–tree, binary tree, and so on. In some embodiments, a means for generating a MAX aggregate for an attribute comprises one or more computers or processors configured to carry out an algorithm disclosed in FIG. 10 and this paragraph. In some embodiments, a means for generating a MIN aggregate for an attribute comprises one or more computers or processors configured to carry out an algorithm disclosed in FIG. 10 and this paragraph.

Figures 11A, 11B:
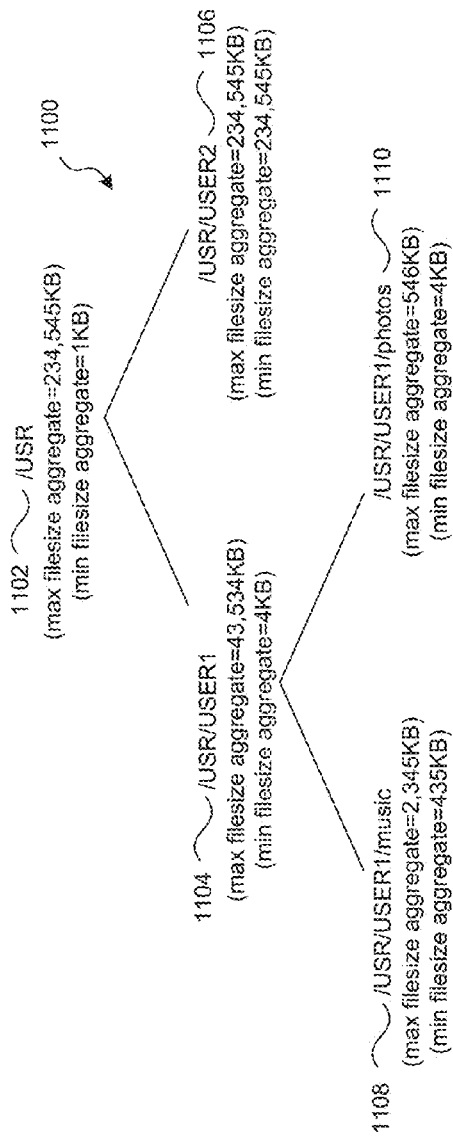
FIG. 11A illustrates a filesystem subtree 1100 illustrating max/min aggregates in accordance with embodiments of the facility.
FIG. 11B is a table that includes a sample of files within the folders representing in subtree 1100 and their corresponding filesizes and time-weighted sizes.

FIG. 11A illustrates a filesystem subtree 1100 illustrating max/min aggregates in accordance with embodiments of the facility. In this example, MAX and MIN filesize aggregates associated with files in the filesystem subtree 1100 are reflected. The shown subtree includes five folders 1102, 1104, 1106, 1108, and 1110. In an example, the facility aggregates the min and max filesizes for each folder by identifying, for each folder, the largest and smallest files in that folder (and its subfolders). In this example, the largest file in subfolder 1108 has a size of 2,345 KB and the smallest file in subfolder 1108 is 435 KB. The MAX/MIN aggregations enable efficient searching of files or folders. For example, if a user is searching for all files larger than 50,000 KB, the facility can skip searching files and folders within folder 904 because its aggregate max filesize is 43,534 KB. As another example, if the user is searching for all files between 2,000 KB and 20,000 KB, the facility can skip searching files and folders within folders 1108 and 1106 because its MIN filesize aggregate is greater than 20,000 KB. As other example, if the user is searching for the largest file in the subtree, the system need only search in folders 1102 and 1106, since they each have the same MAX filesize aggregate. In this manner, the facility improves the speed and efficiency with which a computing system can identify files relevant to a query, such as a user-generated search. In some embodiments, the facility stores, in association with each folder, a pointer to the file or files relevant to the aggregate values. For example, a pointer to /USR/USER2/file1 and a pointer to /USR/file1 may be stored in /USR because they are the largest and smallest files under /USR, respectively. Similarly, a pointer to /USR/USER1/file2 and a pointer to /USR/USER1/photos/file2 may be stored in /USR/USER1 because they are the largest and files under /USR/USER1, respectively. In some embodiments, a pointer to a file is stored in a data structure external to the folder storing the file.

Figure 12:
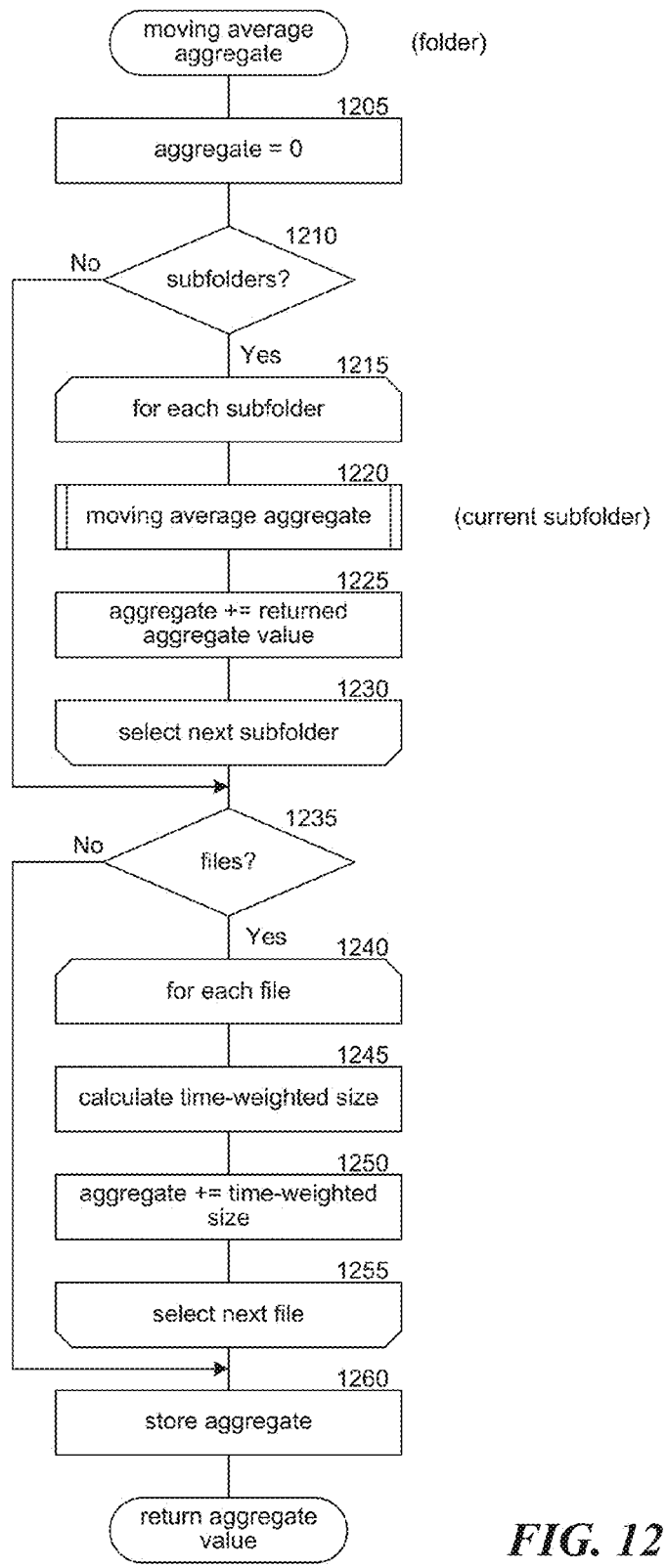
FIG. 12 is a flow diagram illustrating the processing of a moving average aggregate component in accordance with some embodiments of the facility.

FIG. 12 is a flow diagram illustrating the processing of a moving average aggregate component in accordance with some embodiments of the facility. The component is invoked to determine a moving average aggregate for a folder by recursively looping through each of its files and subfolders to determine moving averages for each and combining them into a moving average for the folder. A moving average is a "moving sum" having a particular unit (e.g., I/O operations, file reads, MB) divided by a time period to provide an average with respect to the unit (e.g., I/O operations per second, file reads per minute, 500 MB per hour). In block 1205, the component initializes an aggregate value to 0. In decision block 1210, if the folder contains any subfolders then the component continues at block 1215, else the component continues at decision block 1235. In blocks 1215 through 1230, the component selects each subfolder and calculates a corresponding moving average aggregate. In block 1220, the component recursively invokes the moving average aggregate component for the currently-selected subfolder. In block 1225, the component increases the aggregate value by the value returned by the moving average aggregate component for the currently-selected folder. In block 1230, the component selects the next subfolder and then loops back to block 1215. If all of the subfolders have already been selected then the component continues at decision block 1235. In decision block 1235, if the folder contains any files then the component continues at block 1240, else the component returns the aggregate value. In blocks 1240 through 1255, the component selects each file to calculate a corresponding moving average. In block 1245, the component calculates a time-weighted size for the currently-selected file based on the size of the file and the time at which the file was stored in the folder. For example, if the component is using the exponential decay function:

$$size_{tw} = size * e^{-t},$$

where $size_{tw}$ is the time-weighted size, size is the size of the file, and t is the difference between a base time (e.g., the current time or another time determined by the user, the system, etc.) and the time at which the file was stored in the folder. Although an exponential decay function is provided as an example herein, one of ordinary skill in the art will recognize that a variety of functions can be used, such as a linear decay function, a step or piecewise decay function, and so on. If the decay coefficient is based on a time window (e.g., $e^{-t/(time\ window)}$), then the decay approximates a moving sum for the entire window. For example, a sum of 120 units over a 60 minute moving window approximates one-minute moving average of 2 units per minute. In some embodiments, the component sets the time-weighted size to 0 if the calculated value is below a predetermined threshold (e.g., 0.05 bytes, 1 KB, 1 MB). In block 1250, the component increases the aggregate value by the calculated time-weighted size for the currently-selected file. In block 1255, the component selects the next file and then loops back to block 1240. If all of the files have already been selected then the component continues at block 1260. In block 1260, the component stores the aggregate value generated for the folder and then returns the aggregate value. While the above process is described in the context of a filesystem subtree (e.g., directory structure), one of ordinary skill in the art will recognize that this process can be applied to a variety of hierarchical structures, such as a b-tree, b+tree, b*-tree, binary tree, and so on. In some embodiments, a means for generating a moving average aggregate for an attribute comprises one or more computers or processors configured to carry out the algorithm disclosed in FIG. 12 and this paragraph.

FIG. 11B is a table that includes a sample of files within the folders representing in subtree 1100 and their corresponding filesizes and time-weighted sizes. For example, file /USR/file2 is 32 KB while file /USR/USER1/photos/file1 is 546 KB. In this example, the mtimes associated with each file (see FIG. 9B) correspond to the time at which each file was added to its respective folder. In other words, the files have not been modified since they were created. Furthermore, the facility has employed a decay function producing a half-life of approximately 24 hours and uses the creation time of /USR/USER2/file1 as the base time. Thus, the time-weighted size of /USR/USER2/file1 is the same as its actual size; the time-weighted size of /USR/USER1/file1 is 7.5 KB, which is a quarter of its actual size because it was created 48 hours before /USR/USER2/file1; and the time-weighted sizes of each of the other files is 0 because they were created more than two years before /USR/USER2/file1 and the decay function results in a number smaller than a predetermined threshold (e.g., 1 byte).

Figure 11C:
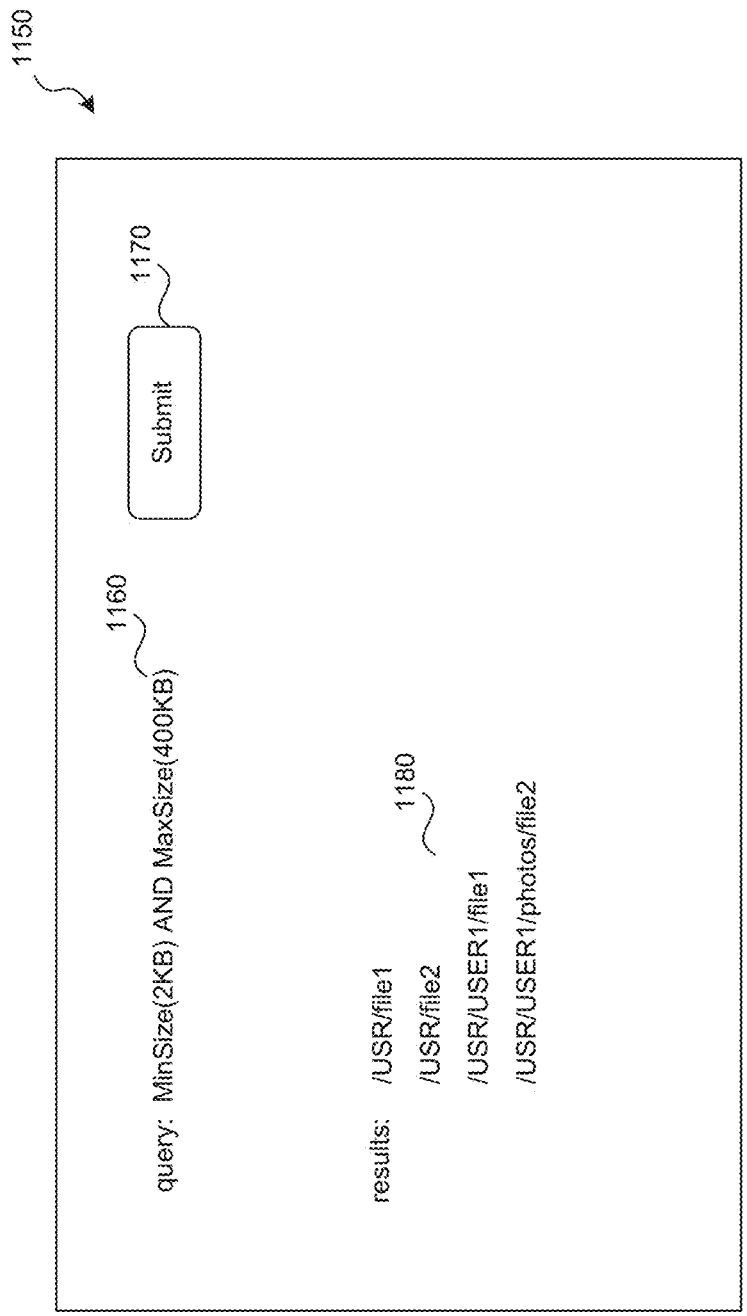
FIG. 11C is a display page illustrating query results generated in response to a query for files satisfying a specified filesize range.

FIG. 11C is a display page 1150 illustrating query results generated in response to a query against subtree 1100 for files satisfying a specified filesize range. In this example, a user has entered a query string 1160 specifying a filesize range of 2 KB and 400 KB using submit button 1170. In response to the query, the computing system traverses the subtree to identify files that satisfy the query based on the min and max filesize aggregates. For example, because the filesize aggregate range for folder 1102 (1 KB to 234,545 KB) includes values in the filesize range specified by the query, the computing system searches folder 1102 for files that satisfy the query. Similarly, because the filesize aggregate ranges for each of folder 1104 (4 KB to 43,534 KB) and folder 1110 (4 KB to 546 KB) include values in the filesize range specified by the query, the computing system searches folders 1104 and 1106 for files that satisfy the query. In contrast, because the filesize aggregate ranges for each of folder 1106 (234,545 KB to 234,545 KB) and folder 1108 (435 KB and 2,345 KB) do not include values in the filesize range specified by the query, the computing system can skip folders 1106 and 1108. Thus, the facility improves the rate at which a computing system searches for and identifies files relevant to a query.

Figure 13:
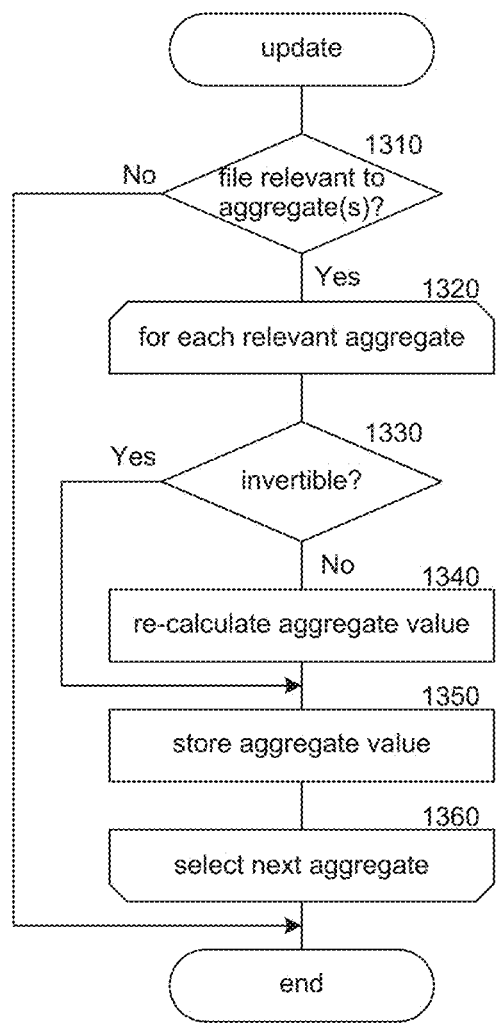
FIG. 13 is a flow diagram illustrating the processing of an update component in accordance with embodiments of the facility.

FIG. 13 is a flow diagram illustrating the processing of an update component in accordance with embodiments of the facility. The facility invokes the update component when there is a change to a hierarchical object, such as a file, folder, or tree node. For example, if a file is modified, added, deleted, or moved from a folder then the facility invokes the update component to update aggregate values. In block 1310, if the file has the potential to affect one or more of the aggregates currently maintained for the folder where the change the occurred (e.g., the folder storing an added or modified file, the folder from which a file was deleted), such as a checksum aggregate or an mtime aggregate for the folder that is the same as the mtime of the file, then the component continues at block 1320, else the component completes processing. As another example, if the mtime of the file is greater than the MAX mtime aggregate for the folder or less than the MIN mtime aggregate for the folder, the component facility invokes the update component. In blocks 1320 through 1360, the component loops through and updates each of the potentially affected aggregates. In decision block 1330, if the currently-selected aggregate is invertible then the component continues at block 1350, else the component continues at block 1340. In block 1340, the component re-calculates the aggregate value based on the change. For example, if a file having an mtime that is the same as the MAX mtime aggregate for the folder is deleted from the folder, then the component will search for a new file to use to update the MAX mtime aggregate based on the change. As another example, if a file is removed then a checksum aggregate can be re-calculated based on the change. In block 1350, the component stores the re-calculated aggregate value for the currently-selected aggregate for the folder and its ancestor folders. In some embodiments, a node in a filesystem tree has multiple parents, such as multiple directories or nodes containing hard links to the same file. In this case, the facility selects a "canonical" parent for the node and treats the other parents as "non-canonical" parents. Selection of the canonical parent is based on an immutable and comparable attribute of nodes, e.g. a numeric inode identifier, the order in which nodes were designated as a parent, and so on. Aggregates related to the node with multiple parents are computed as though the node is a child of the canonical parent while aggregates for the non-canonical parents are computed as if the node is not one of its children. In this manner, the node is not overrepresented in the aggregates of its parents. If the canonical parent of a node changes (e.g., due to unlinking from the current canonical parent, or linking into a new parent which becomes the canonical parent based on the selection method), the facility reconciles aggregates for the node as if it were a delete from the old canonical parent and an add to the new canonical parent. In block 1360, the component selects the next aggregate and then loops back to block 1320. If all of the aggregates have already been selected then processing of the component completes. While the above process is described in the context of a filesystem subtree (e.g., directory structure), one of ordinary skill in the art will recognize that this process can be applied to a variety of hierarchical structures, such as a b-tree, b+tree, b*-tree, binary tree, and so on. In some embodiments, a means for updating aggregates comprises one or more computers or processors configured to carry out the algorithm disclosed in FIG. 13 and this paragraph.

FIG. 14 is an example screenshot of graphical user interface displayed on a client device, such a computing device. The user may elect to view various analytics 1402 regarding the filesystem, such as a particular filesystem tree structure. For example, the user may select a particular directory, e.g., root directory "/", for which to view those analytics. In response, the facility returns the one or more metric values along with a graphical representation of those metric values corresponding to a pathname 1404 indicating the selected directory. The metric values include storage data for the indicated root directory "/", such as an overall size (277.5 gigabytes) 1406 of the directory 1404, including a percentage (99.7%) of available storage capacity used by that directory, and a percentage (5.69%) of overall storage capacity used by that directory in the facility. The metric values include a recent access (raccess) date 1410 on which any file in the directory was last modified and a creation date 1408 on which the directory was created. Additionally, the metric values indicate an aggregate number (8288) of directories 1412 in the directory 1404 and an aggregate number (56877) of files 1414 in that directory.

In some embodiments, the graphical user interface indicates metric values for operations performed in a directory or its subtree. For example, a listing of the top I/Os per second ("IOPS") activity 1416 (e.g., read operations and write operations) among subdirectories of the selected directory 1404 is displayed. In some embodiments, the facility maintains and provides values for other metrics, such as metrics related to capacity or diskspace usage, processor usage or availability, throughput (e.g., bytes per second, megabytes per minute), file usage (or non-usage), and so on. Each of these directory entries includes the path of the file at which the I/O is performed along with the number of I/O operations performed per second with respect to that file. A user can select parameters for returning the IOPS activity as well. For example, in some embodiments, the user can elect to view any IOPS namespace activity 1420 related to reads and/or writes to namespaces or directories (e.g., changes to directory information or directory metadata) in the selected directory. In other embodiments, the user may elect to view IOPS file activity 1422 related to files contained in the directories of the root directory (e.g., changes to file contents or file metadata).

In some embodiments, the facility generates the graphical user interface based on data collected by periodically or probabilistically sampling activity within the system according to a sampling rate or sampling frequency (e.g., read operations, write operations, diskspace usage or availability, processor usage or availability, throughput, and so on) or retrieves metadata for directories or files. For example, in various embodiments the facility samples and records I/O operations according to a sampling rate of once per second or once per millisecond. In some embodiments, the facility employs a dynamic sampling rate that changes over time based on, for example, the rate at which activities are performed or the rate at which an activity data structure for recording the samples fills up. In some embodiments the facility samples and records every other I/O operation or every fifth I/O operation. In various embodiments, the facility maintains information about the sampled I/O operations in a data structure used by the facility to generate the graphical user interface. In various embodiments, the data structure includes, for example, the time of the I/O operation, the type of the I/O operation, a path associated with the I/O operation, the user and/or process that caused the I/O operation, the size of the I/O operation, and so on. The facility is configured to discard or delete operations from the data structure based on the total number of operations stored in the data structure or the age of the operations. For example, the facility may set a maximum threshold number of operations (e.g., 200, 5000, 90,000, 100,000) and discard the oldest entries once the maximum threshold number is met. As another example, the facility may discard any operations that occurred outside of (earlier than) a specified time window, such as a day, a week, a month, and so on. In some cases, the facility uses a combination of time and total number of operations. In some embodiments, the facility uses folder metadata (e.g., aggregate metrics) as an alternative to, or in addition to, the sampled data. Although the above examples have been described in the context of I/O operations, one of ordinary skill in the art will recognized that other metric values can be maintained and recorded through sampling and other means described herein.

The graphical representation of the metric values can include the directories of first-level (e.g., rank 1) that are children of the root directory "/", represented by the columns 1418 of the graphic. The height (y-axis) 1424, 1426, 1428, and 1430, of each directory rectangle reflects the aggregate number of files or storage capacity used by that directory in relation to its parent directory. Accordingly, some of the smaller-size directories may not be visible in the graphical representation of the root directory shown in FIG. 14.

Figure 15A:
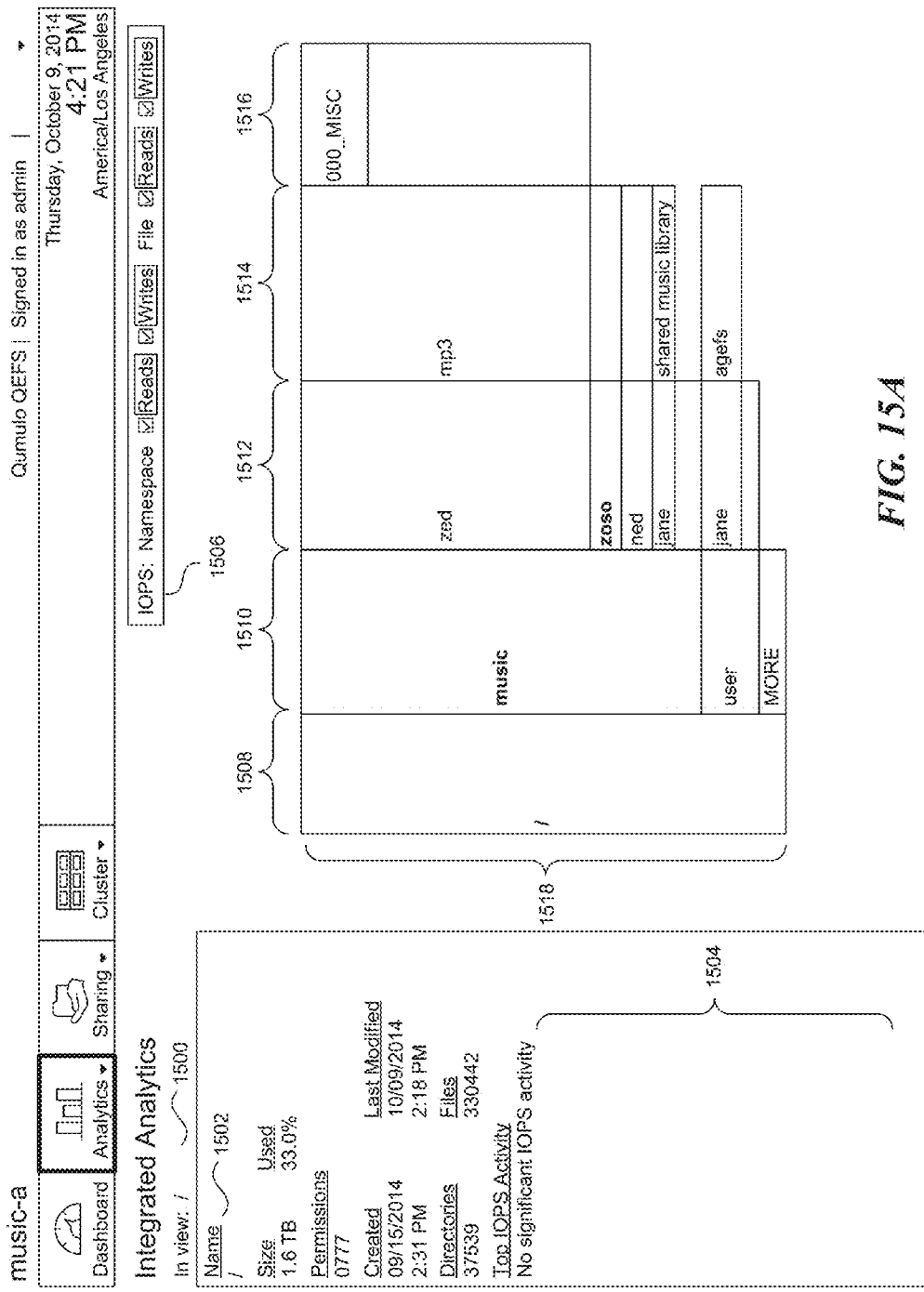
Figure 15C:
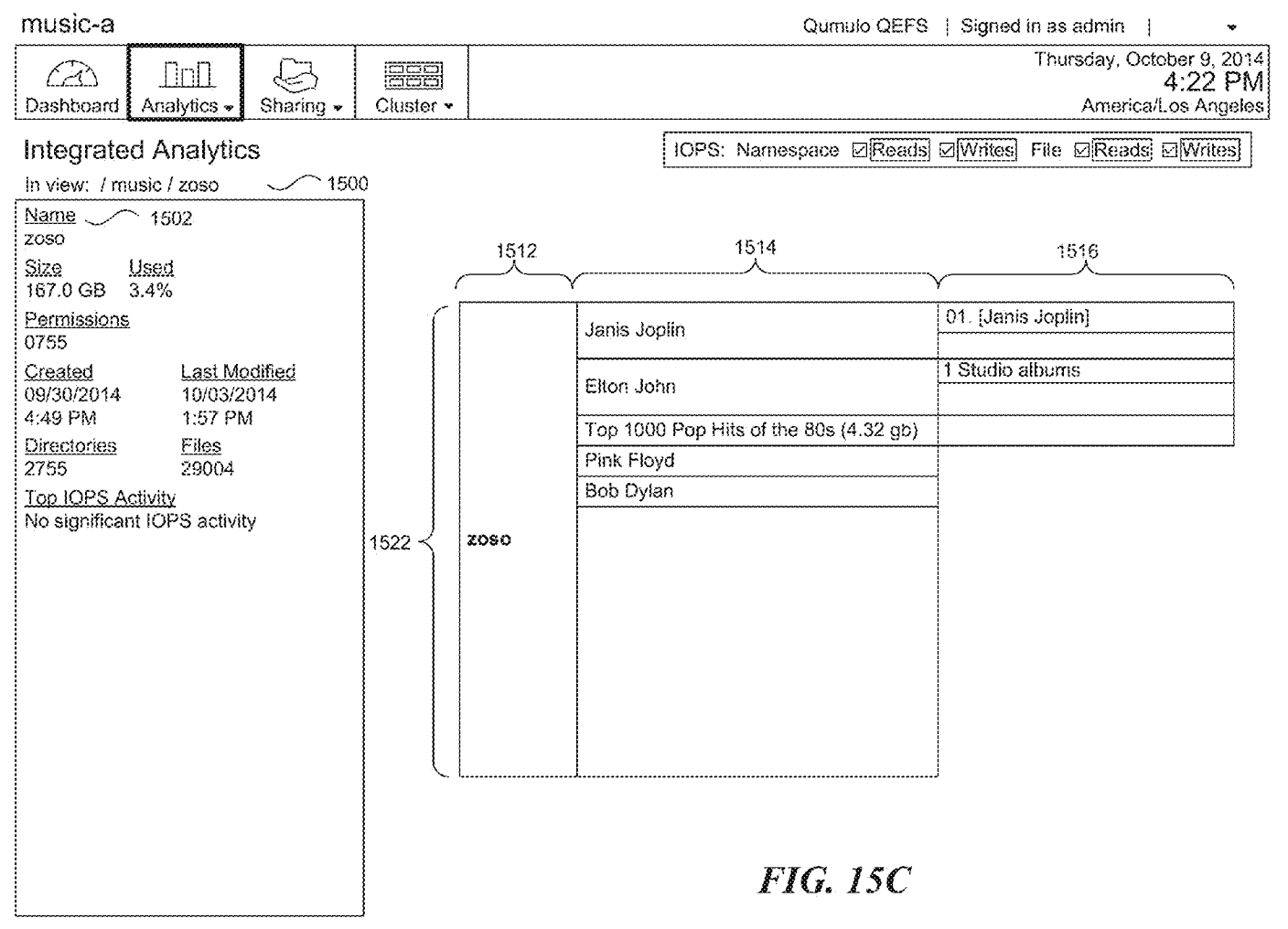

FIGS. 15A-15C are example screenshots of a graphical user interface displaying on a client device metrics for various directories in a filesystem tree. In FIG. 15A, a root directory is shown to be selected at the corresponding path 1500 in the filesystem, which is further indicated by the pathname "/" 1502 proximate to a plurality of analytics relating to that directory. Within the selected directory, there has been no recent activity. Accordingly, though each operation performed on the directory 1506 is selected for display, the IOPS activity 1504 in the cumulative analytics is empty. The size of the selected directory is graphically represented by the height of the column indicating that directory. In particular, column 1508 indicates directory "/" and its height 1518 corresponds to the size of the root directory (1.6 TB). The size of each of the three directories within the root directory (/music, /user, /MORE) is further indicated by the height of each of those child directories in relation to the root directory. So, based on the visual representation, the /music directory in column 1510 is clearly the largest, with the /user directory consuming more than the /MORE directory. To determine the exact size of a directory visible within the graphical representation, such as the "music" directory, the user simply selects that directory in the graphical representation.

FIG. 15B shows an example screenshot of the graphical user interface displaying analytics for the "music" directory after selection of that directory in FIG. 15A. As shown, the directory path 1500 now indicates the path "/music" for the /music directory. Additionally, the pathname 1502 and corresponding analytics are also updated to reflect analytics specific to that selected directory. In the graphical representation, the /music directory column 1510 is the leftmost column and each of the directories in the music directory are further expanded and detailed in the graphical representation. The height 1520 of the /music directory column 1510 now corresponds to 1.3 TB as indicated in the analytics for that directory. To determine the metrics of any child (or descendent) directory contained by the /music directory, the user can then select a displayed directory in the graphical representation. For example, the user can select the /music/zoso directory in column 1512, which shows the child directories for the /music directory.

FIG. 15C shows an example screenshot of the graphical user interface displaying analytics for the /music/zoso directory after selection of that directory in FIG. 15B. After selection of the /music/zoso directory, the path 1500 is updated to show the path for that directory "/music/zoso" and the path name 1502 is updated as well. The graphical representation is also updated to reflect the /music/zoso directory at the leftmost column 1512 and the corresponding directories (or files) contained by the /music/zoso directory. As with the preceding FIGS. 15A-15B, the height 1522 of the /music/zoso directory corresponds to the size (167.0 GB) of the directory. Furthermore, the height of each directory in each child or descendant directory in relation to the parent directory corresponds to the size of that directory.

Figure 16:
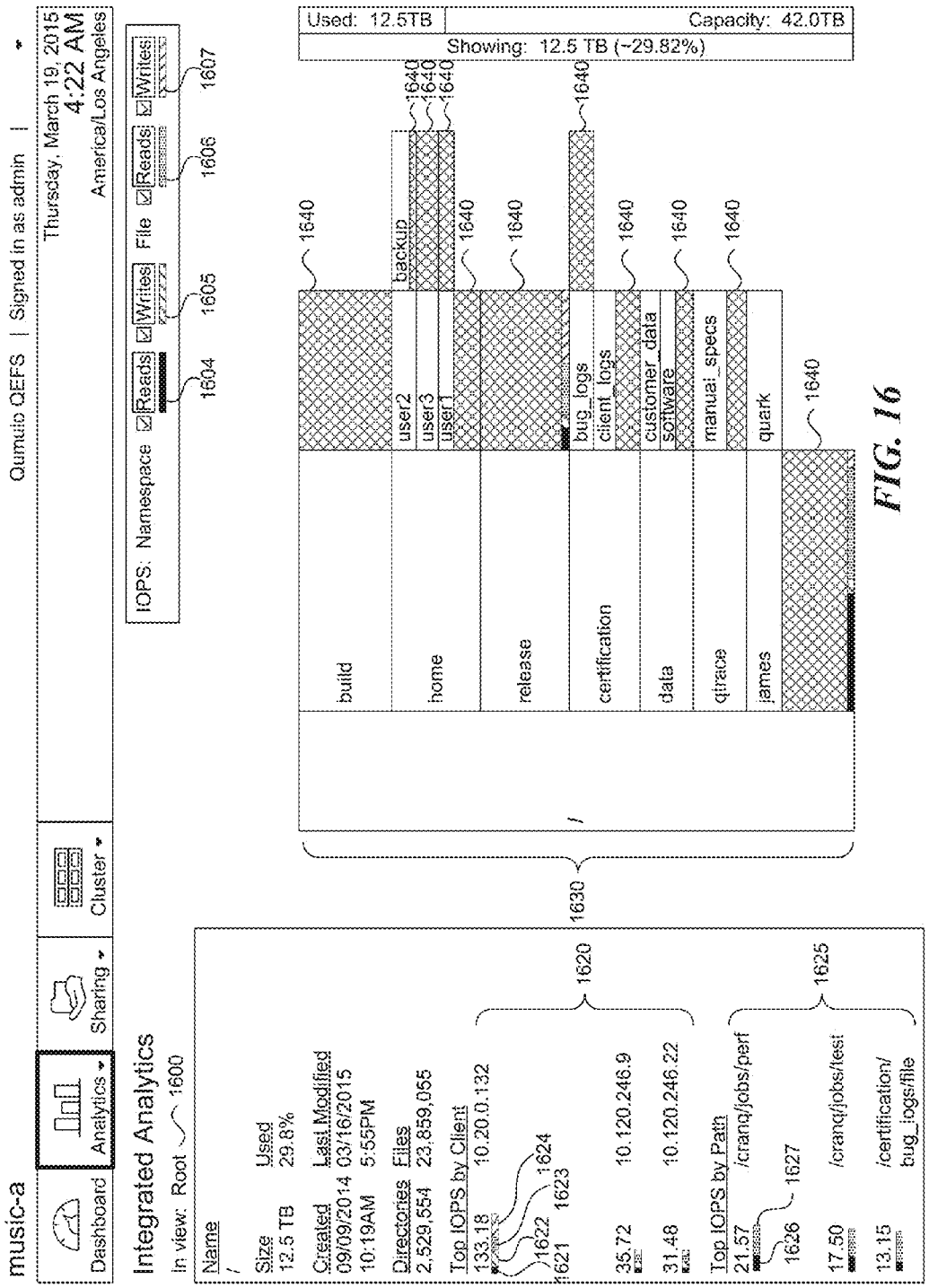
FIG. 16 is an example screen shot of the graphical user interface displaying analytics for a root directory.

FIG. 16 is an example screen shot of the graphical user interface displaying additional analytics for a root directory.

In this example, the graphical user interface includes an indication of operations performed by the system, including an indication of the clients performing the greatest number of IOPS (1620) and the paths with the greatest number of IOPS (1625) during a previous period. The graphical user interface also includes an indication of the number of IOPS performed for each represented client (e.g., 133.18 IOPS for the client represented by the IP address 10.20.0.132) and an activity bar for each represented client. In this example, each activity bar indicates, for a particular client, numbers of I/O operations of different types performed per second by that client. An activity bar made up of activity bar segments 1621-1624 shows namespace reads (activity bar segment 1621), namespace writes (activity bar segment 1622), file reads (activity bar segment 1623), and file writes (activity bar segment 1624) for the client associated with the IP address 10.20.0.132 during a previous period (e.g., one day, two weeks, three months). The size of each activity bar segment is based on the ratio of the number of corresponding activities associated with the activity bar segment (e.g., namespace writes per second) and the total number of related activities (e.g., total IOPS). The client associated with IP address 10.20.0.132 has most commonly performed file writes 1624, followed by namespace writes 1622, file reads 1623, then namespace reads 1621. Similarly, activity bar segments 1626 and 1627 represent the proportional number of namespace reads 1626 of the object or objects represented by the path "/cranq/jobs/perf" and the proportional number of file reads of the object or objects represented by the path "/cranq/jobs/perf." The activity bar segments are shaded to match the shade legend 1604-1607. In some embodiments, the facility shades these proportional bar segments using other techniques, such as different colors, and so on. In this example, and as discussed above, the size or height of each of the boxes 1630 in the graphical user interface are proportional to the size of the files stored within the directory or files represented by that box. For example, the total size of the files stored in the directory titled "build" is greater than the size of the files stored in the directory titled "james." In some cases, if the size or the height of a directory is less than a predetermined threshold (e.g., 1 pixel, 50 pixels, 100 pixels, 10 points (font)), the facility groups the directory with other small directories and represents those directories as a single displayable feature (e.g., box). In this example, boxes 1640 each represent directories that the facility has determined are too small to display individually.

Figure 17:
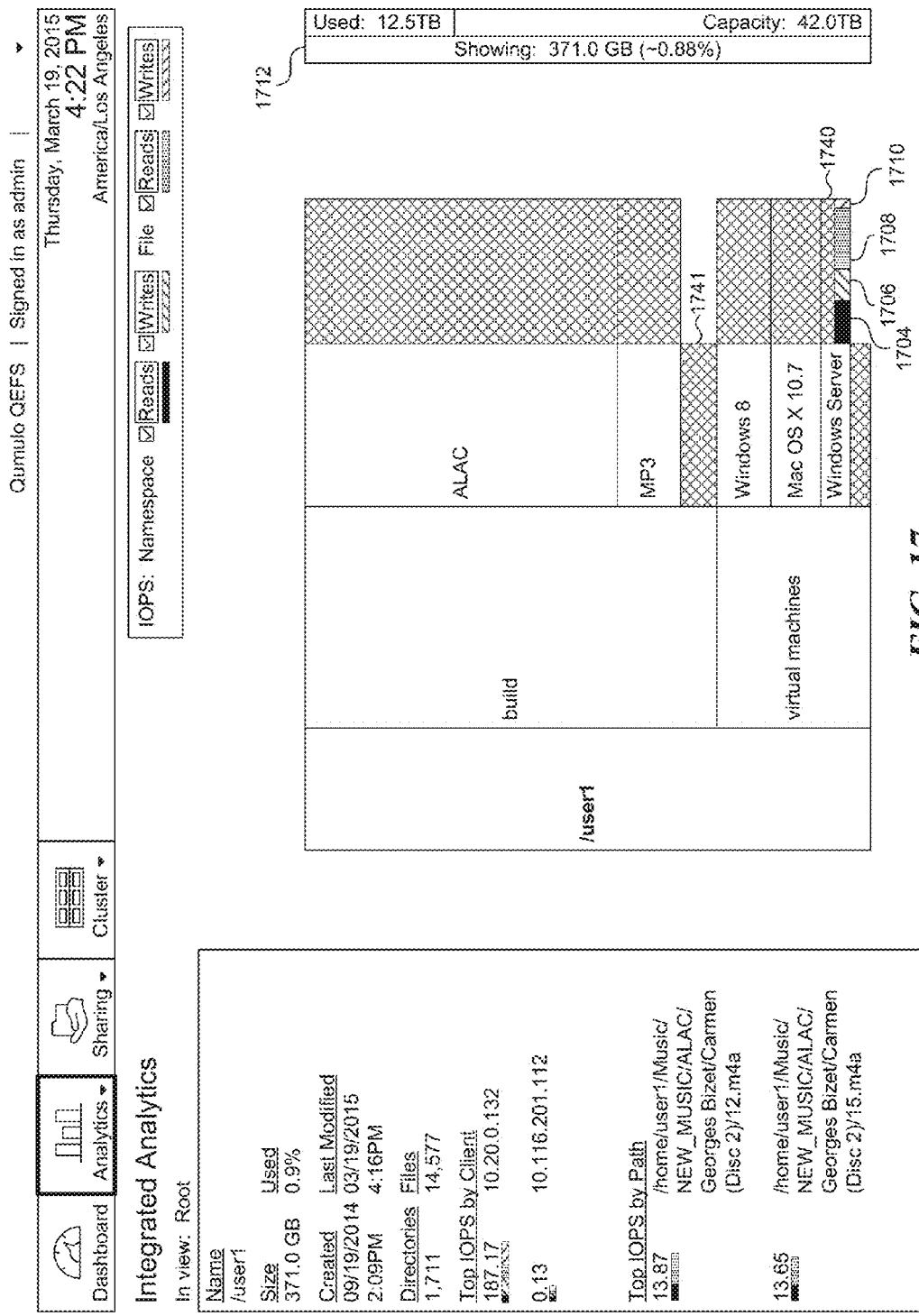
FIG. 17 is an example screen shot of the graphical user interface displaying analytics for a "user1" directory under the root directory.

FIG. 17 is an example screen shot of the graphical user interface displaying additional analytics for a "user1" directory under the root directory. The analytics represented in this example include analytics similar to those discussed above, and also include activity bar segments 1704-1710 and diskspace usage chart 1712. In this embodiment, each activity bar segments represents a number of IOPS performed with respect to files and directories within the directories represented by box 1740, including namespace reads (activity bar segment 1704), namespace writes (activity bar segment 1706), file reads (activity bar segment 1708), and file writes (activity bar segment 1710). In some embodiments, the facility includes activity bars for other directories or collections of directories, such as the "virtual machines" directory, the directories represented by box 1741, and so on. Diskspace usage chart 1712 includes information related to the diskspace usage of the currently selected directory and the system as a whole. In this example, the overall capacity of the system is 42.0 TB, of which 12.5 TB is currently being used. Furthermore, there are currently 371.0 GB stored in the "user1" directory.

Figure 18:
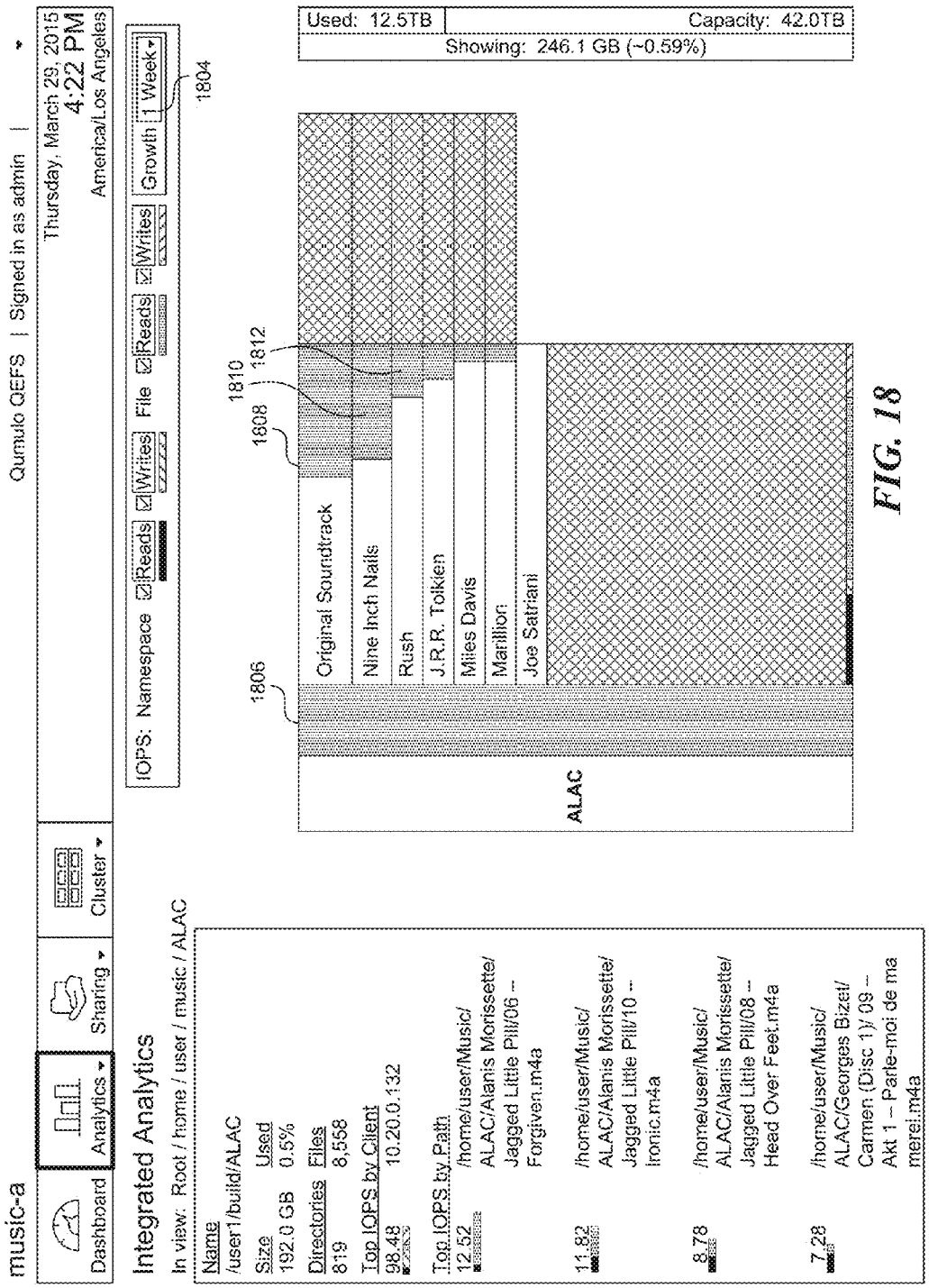
FIG. 18 is an example screen shot of the graphical user interface displaying analytics for an "ALAC" directory under the "user1/build" directory.

FIG. 18 is an example screen shot of the graphical user interface displaying additional analytics for an "ALAC" directory under the "user1/build" directory. The analytics represented in this example include analytics similar to those discussed above, and also includes period selection tool 1804 and growth bars, including growth bars 1806-1812, which can be included in the graphical user interface as, for example, an overlay. In this embodiment, the period selection tool is a dropdown menu enabling a user to define a previous period (e.g., minute, hour, 12 hours, day, week, month, and so on). In some embodiments, the facility uses a default or automatically selected period. Each growth bar represents, for a given directory or file, the extent to which the directory or file has changed in size over a previous period (e.g., the period defined by the period selection tool 1804). In this example, growth bars 1806-1812 are shaded and represent the extent to which the size of a corresponding directory or file has changed over the previous week. For example, the directory titled "ALAC" has nearly doubled in size over the previous week while the directory titled "Original Soundtrack" has increased by approximately 66% over the previous week. In contrast, the directory titled "Joe Satriani" has not grown over the previous week. While each growth bar is shaded in FIG. 8, in some embodiments the facility colors each growth bar. For example, the facility may use a green growth bar to represent the extent to which the size of a directory or file has increased over a previous period and a red growth bar to represent the extent to which the size of a directory or file has decreased over the previous period. In some embodiments, rather than using a separate growth bar, the facility employs a heatmap by coloring or shading the entire box representing a directory or file using a range of colors to represent the extent to which the size of the directory or file has changed over time, such as bright green for significant increases in size through dark green or black for small increases in size and bright red for significant decreases in size through dark red or black for small decreases in size. In some embodiments, the facility changes the size of each box to represent the relative growth of the corresponding directory or file rather than using the current size of the directory or file as the basis for the size of the corresponding box. In some embodiments, the facility overlays an icon or number indicating the growth of a directory or file on the corresponding box in the graphical user interface. Although growth bars representative of a growth metric are reflected in this example, one of ordinary skill will recognize that other metrics may be represented as secondary or tertiary bars or graphics in the graphical user interface, such as capacity or diskspace usage or availability, processor usage or availability, throughput (e.g., bytes per second, megabytes per minute), file usage (or non-usage), and so on.

Figure 19:
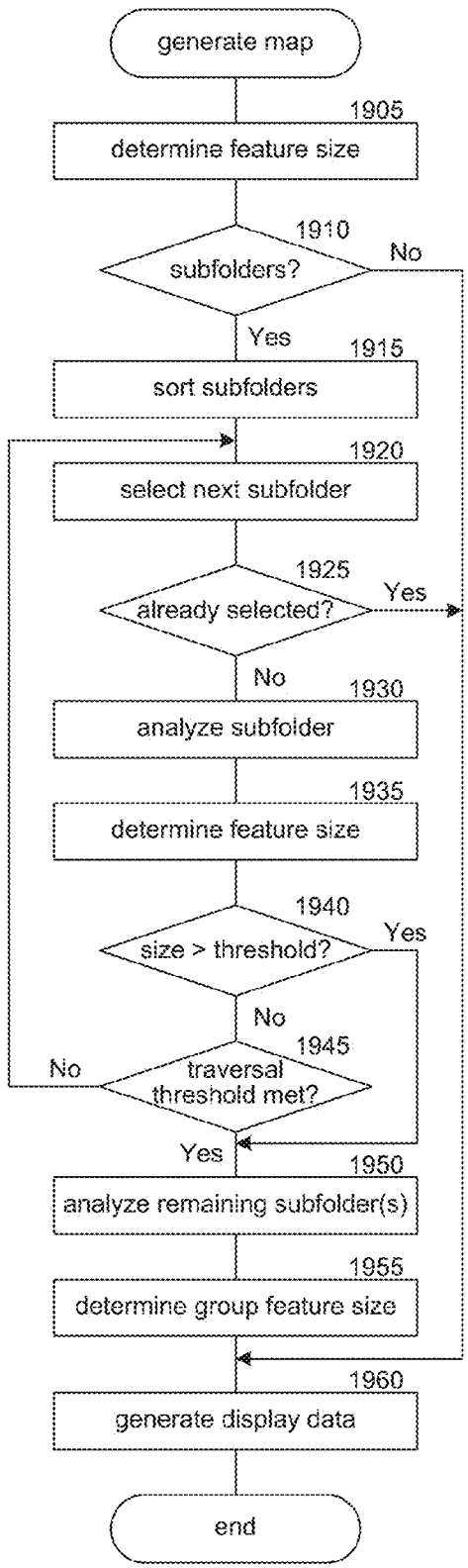
FIG. 19 is a flow diagram illustrating the processing of a generate map component in accordance with some embodiments of the facility.

FIG. 19 is a flow diagram illustrating the processing of a generate map component in accordance with some embodiments of the facility. The facility invokes the generate map component to create graphical user interfaces to show integrated analytics for capacity and/or performance for a selected folder. In block 1905 the component determines a size for a feature (e.g., box) to represent the selected folder based on, for example, the dimensions (e.g., height and width) of a displayable area. For example, the component may set the height of a box as 60% of the height of the available display area and the width as 10% of the width of the available display area. In decision block 1910, if the selected folder has any subfolders then the component continues at block 1915, else the component continues at block 1960. In block 1915, the component sorts the subfolders based on the type of graphical user interface to be displayed. For example, if the graphical user interface includes features for each folder or subfolder where the size of the feature is indicative of the size of the data stored in the folder (and its subfolders), then the component sorts the subfolders in order from largest to smallest. As another example, if the graphical user interface includes features for each folder or subfolder where the size of the feature is indicative of the recent growth (positive or negative) of the data stored in the folder (and its subfolders), then the component sorts the subfolders in order from largest magnitude of growth to the smallest. In block 1920, the component selects the next subfolder from the sorted set of subfolders, starting with the first subfolder. In decision block 1925, if the subfolder has already been selected then the component continues at block 1960, else the component continues at block 1930. In block 1930, the component analyzes the currently-selected subfolder by, for example, determining the size of the files stored in the currently-selected subfolder (and its subfolders), retrieving metadata stored for the currently-selected subfolder, retrieving other metrics for the subfolder (e.g., aggregate values), and so on. In various embodiments, the facility retrieves information from an activity array configured to store a history of activities or operations that have occurred within the system, such as namespace reads, namespace writes, file reads, file writes, and so on. If the activity array is generated through sampling, then the facility divides any activity counts calculated from the data stored in the array by the sampling rate so that the values generated from the activity array more accurately reflect the activities performed by the system. In some embodiments, the component recursively invokes the generate map component for the currently-selected subfolder. In block 1935, the component determines a size for a feature (e.g., box) to represent the currently-selected subfolder based on, for example, the attributes of the subfolder and the dimensions of the display area. For example, if the size of the data stored under the currently-selected folder is 50% of the size of the data stored in its parent folder, then facility may set the height of a box for the currently-selected folder as half of the height of a box of its parent folder. In decision block 1940, if the determined feature size for the currently-selected subfolder is greater than a size threshold (e.g., a height threshold of 50 pixels or 10 points (font)), then the component continues at block 1950, else the component continues at decision block 1945. In decision block 1945, if a traversal threshold is met, then the component continues at block 1950, else the component loops back to block 1920 to select the next subfolder in the sorted set of subfolders. In some embodiments, the traversal threshold is based on how deep the component has traversed through the directory tree (e.g., 2 levels, 5 levels, 10 levels), the number of directories that have been traversed, or the number of files that have been traversed. In block 1950, the component analyzes the remaining folders in the sorted set of folders to determine attributes for the group of remaining folders as a whole (e.g., overall size, overall growth, disk usage). In block 1955, the component determines a size for a feature to represent the remaining subfolders based on, for example, the attributes determined for the group of remaining subfolders as a whole. In block 1960, the component generates display data based on the determined feature sizes and any additional metadata associated with the represented folders, such as total size, total IOPS, top clients, top IOPS by path, overall disk usage, activity bars, growth bars, disk availability, size of the data represented in the graph, and so on. In some embodiments, a means for generating a capacity or performance map comprises one or more computers or processors configured to carry out an algorithm disclosed in FIG. 19 and this paragraph.

Figure 20:
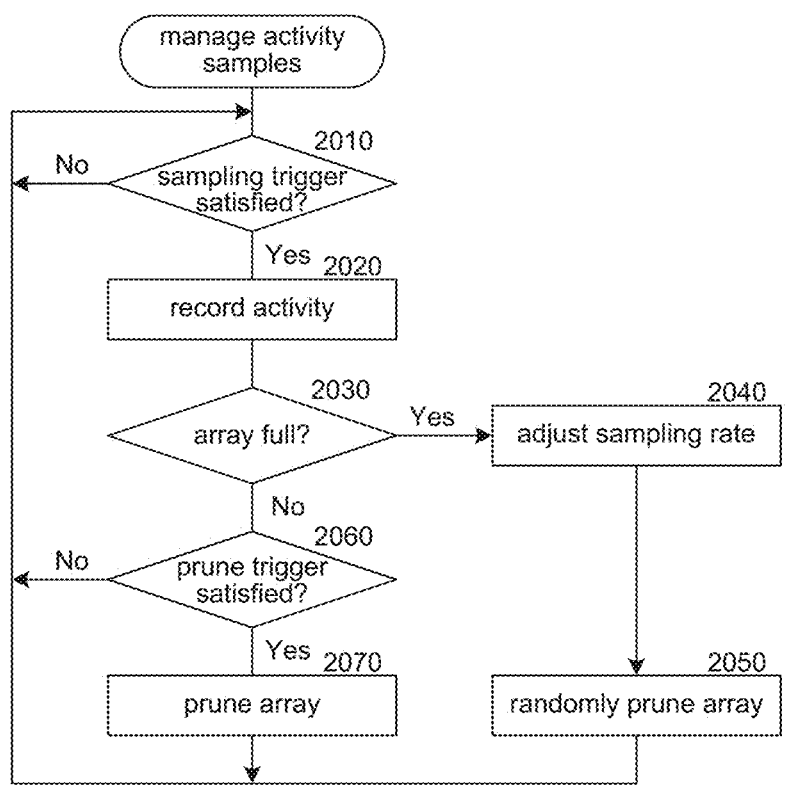
FIG. 20 is a block diagram illustrating the processing of a manage samples component in accordance with some embodiments of the facility.

FIG. 20 is a block diagram illustrating the processing of a manage activity samples component in accordance with some embodiments of the facility. The facility invokes the manage activity samples component to manage data used to generate graphical user interfaces in some embodiments. In block 2010, if a sampling trigger has been satisfied, then the component continues at block 2020, else the component loops back to block 2010. For example, the sampling trigger may be a countdown timer (e.g., sample once per millisecond) or an operations count (e.g., sample once every 50 operations). In block 2020, the component records a sampled activity in an activity data structure (e.g., array) including, for example, the type of activity (e.g., read/write), the associated path, the associated client, the size of the operation, and so on. In decision block 2030, if the activity data structure is full then the component continues at block 2040, else the component continues at decision block 2060. In block 2040, the component decreases the sampling rate by a predetermined factor (e.g., ½, ⅓, ¼, 1/10). For example, if the current sampling rate is two samples per second, the facility may reduce the sampling rate to one sample per second (i.e., decreasing the sampling rate by ½). In block 2050, the component randomly or probabilistically prunes activities from the activity data structure by the same factor as the sampling rate was adjusted and then loops back to block 2010. For example, if the sampling rate was reduced by ⅔ (e.g., from three samples per second to one sample per second), then ⅔ of the entries in the activity data structure are removed so that the activity data structure is ⅓ full. In decision block 2060, if a prune trigger is satisfied, then the component continues at block 2070, else the component loops back to decision block 2010. For example, the prune trigger may be a countdown timer (e.g., prune ten times per minute) or an operations count (e.g., prune after every 100 operations). In block 2070, the component prunes the activity data structure by removing activities that are outside of a time window defined by a user or the system and then loops back to block 2010. In some embodiments, a means for managing activity samples comprises one or more computers or processors configured to carry out an algorithm disclosed in FIG. 20 and this paragraph.

By providing enhanced visibility into the attributes of a data storage filesystem aggregated and stored at different levels in the filesystem hierarchy may facilitate management of the filesystem. It may be desirable to acquire analytics on portions or the entirety of a data storage filesystem tree. Analytics may relate to system capacity such as space usage by subdirectories, file counts, what is the newest/oldest file in a directory/tree, what file is most/least accessed, a histogram of file sizes, a breakdown of characteristics by file type such as space usage, file count, and the like. Other analytics may relate to performance such as transfer rates, I/O operations such as total operations, timing of I/O operations, latency and the like. This information may be used by system administrators for purposes such as: allocation of most frequently accessed data to data storage devices having a fast response time; customized backups based on date of most recent modification or change; resource planning based on total block usage by filesystem; and the like.

Live metrics of aggregate file attributes are therefore stored by the facility in the inode of a directory in the filesystem tree structure. The metric values are live in the sense that they are updated with respect to received updates for any filesystem object within the tree structure. Though each metric value may not reflect the most recent update to a particular directory, those metric values are current, or relatively current. Accordingly, the requested metric values are returned with a very low degree of latency unlike external systems. In some embodiments, the metrics are gathered from a recent system snapshot, where snapshot frequency and resulting latency may be set by a system administrator.

In some embodiments, in addition to storing metrics in the inodes of directories that are aggregated from the filesystem objects of the subtree defined by each directory, the facility also stores metrics in the inodes of files that relate solely to each file. The file metrics are copies of the file's attributes. In some embodiments, files can be added to the set of filesystem objects to be updated, as discussed in FIGS. 7A-7D.

In various embodiments, this information may facilitate the understanding of additional filesystem characteristics that may not be embedded in metadata such as: what percent of space within the filesystem is consumed by particular types of file (e.g., music files), how many files are owned or controlled by, or were created by, a particular user, information relative to additional user specified attributes (e.g., client or patient names) which may be embedded into file name structure, tags in file header data and the like.

From the foregoing, it will be appreciated that specific embodiments of the invention have been described herein for purposes of illustration, but that various modifications may be made without deviating from the scope of the invention. For example, while various aspects of the facility are described with reference to filesystem subtrees (e.g., directory structures), one of ordinary skill in the art will recognize that this process can be applied to a variety of hierarchical structures, such as a b–tree, b+tree, b*–tree, binary tree, and so on. Accordingly, the invention is not limited except as by the appended claims.

We claim:

1. A method for generating a graphical user interface for assessing metrics in a hierarchical filesystem comprising a filesystem tree comprised of nodes including a root node, wherein each non-leaf node of the tree represents a directory, the method comprising:
   causing to be displayed, for a first directory, a first displayable feature having a first area, wherein the first area is determined based at least in part on a value of a first metric determined for the first directory;
   for each of a plurality of filesystem objects within the first directory,
      causing to be displayed, for the filesystem object within the first directory, a displayable feature having an area determined based at least in part on:
         a value of a first metric determined for the filesystem object within the first directory, and
         the first area; and
   for at least one of the plurality of filesystem objects within the first directory,
      for each of a plurality of activity types,
         causing to be displayed, for the activity type, a displayable feature having a length determined based at least in part on a value of a second metric determined for the filesystem object within the first directory, wherein one or more displayable features for one or more activity types that are displayed by the graphical user interface to a user are employed to manage one or more resources for one or more portions of the hierarchical file system.

2. The method of claim 1, wherein the plurality of activity types include namespace writes and namespace reads,
wherein a size of the displayable feature displayed, for the at least one filesystem object within the first directory, is determined based at least in part on a number of namespace writes performed for the at least one filesystem object within the first directory during the first period, and
wherein a size of the displayable feature displayed, for the at least one filesystem object within the first directory, is determined based at least in part on a number of namespace reads performed for the at least one filesystem object within the first directory during the first period.

3. The method of claim 2, further comprising:
determining a size of at least one filesystem object within the first directory at least in part by retrieving an aggregate value associated with the at least one filesystem object within the first directory.

4. The method of claim 1, wherein the plurality of activity types include file writes and file reads.

5. The method of claim 1, further comprising:
for each of a plurality of subdirectories of the first directory,
in response to determining that a calculated size for a displayable feature associated with the subdirectory of the first directory is smaller than a size threshold,
grouping the first subdirectory of the first directory with at least one other subdirectory of the first directory, and
causing to be displayed a displayable feature whose size is based on sizes of the contents of each of the grouped subdirectories of the first directory.

6. The method of claim 5, further comprising:
periodically pruning entries in the activity data structure based at least in part on a first pruning rate and a time window.

7. The method of claim 1, further comprising:
sampling activities within the filesystem in accordance with a first frequency; and
for each sampled activity within the filesystem,
storing an indication of the sampled activity within an activity data structure, each entry in the activity data structure comprising:
an activity type associated with the sampled activity,
an indication of a client associated with the sampled activity,
a time associated with the sampled activity, and
a size associated with the sampled activity.

8. The method of claim 7, further comprising:
in response to determining that the activity data structure is full,
randomly removing a first percentage of entries from the activity data structure, and
adjusting a sampling rate based at least in part on the first percentage and the first frequency.

9. The method of claim 1, further comprising:
for each of a plurality of clients,
determining a number of input/output operations performed by the client during the first period; and
sorting the clients based on the determined numbers of input/output operations performed by the clients during the first period.

10. The method of claim 9, further comprising:
for at least one of the plurality of clients,
displaying an indication of the number of input/output operations performed by the client during the first period.

11. The method of claim 1, further comprising:
determining a number of reads and writes performed with respect to a first subdirectory of the first directory; and
causing to be displayed, for the first subdirectory of the first directory,
a displayable feature whose size is determined based at least in part on a ratio of the number of reads performed with respect to the first subdirectory of the first directory and the number of reads and writes performed with respect to the first subdirectory of the first directory, and
a displayable feature whose size is determined based at least in part on a ratio of the number of writes performed with respect to the first subdirectory of the first directory and the number of reads and writes performed with respect to the first subdirectory of the first directory.

12. The method of claim 1, further comprising:
for each of the plurality of filesystem objects within the first directory,
causing to be displayed a displayable overlay having an area determined based at least in part on a change in capacity usage of the filesystem object within the first directory.

13. A computing system for generating a graphical user interface for assessing metrics in a hierarchical filesystem comprising a filesystem tree comprised of nodes including a root node, wherein each non-leaf node of the tree represents a directory, the computing system comprising:
a processor;
a memory;
a component configured to cause to be displayed, for a first directory, a first displayable feature having a first area, wherein the first area is determined based at least in part on a size of the contents of the first directory;
a component configured to, for each of a plurality of filesystem objects within the first directory,
cause to be displayed, for the filesystem object within the first directory, a displayable feature having an area determined based at least in part on:
a value of a first metric determined for the filesystem object within the first directory, and
the first area; and
a component configured to, for at least one of the plurality of filesystem objects within the first directory,
for each of a plurality of activity types,
cause to be displayed, for the activity type, a displayable feature having a length determined based at least in part on a value of a second metric determined for the filesystem object within the first directory, wherein one or more displayable features for one or more activity types that are displayed by the graphical user interface to the user are employed to manage one or more resources for one or more portions of the hierarchical file system.

14. The computing system of claim 13, further comprising:
means for generating a capacity or performance map.

15. The computing system of claim 13, further comprising:
means for managing activity samples.

16. A computer-readable non-transitory medium storing instructions that, when executed by a computing system having a memory and a processor, cause the computing system to perform a method for generating a graphical user interface for assessing metrics in a hierarchical filesystem comprising a filesystem tree comprised of nodes including a root node, wherein each non-leaf node of the tree represents a directory, the method comprising:

causing a displayable feature to be displayed for a first directory, the displayable feature for the first directory having a size based at least in part on:

a value of a first performance or capacity metric generated for the first directory, and a displayable area of a graphical user interface; and for each of a plurality of filesystem objects within the first directory, causing a displayable feature to be displayed for the filesystem object within the first directory, the displayable feature for the filesystem object within the first directory having a size based at least in part on:

a value of the first performance or capacity metric generated for the filesystem object within the first directory, and the size of the displayable feature displayed for the first directory; and wherein one or more displayable features for one or more activity types that are displayed by the graphical user interface to a user are employed to manage one or more resources for one or more portions of the hierarchical file system.

17. The computer-readable non-transitory medium of claim 16, wherein the first performance or capacity metric is based on excess capacity so that the size calculated for a displayable feature associated with a first filesystem object within the first directory is based on a measure of excess capacity.

18. The computer-readable non-transitory medium of claim 16, wherein the first performance or capacity metric is based on throughput so that the size calculated for a displayable feature associated with a first filesystem object within the first directory is based on a measure of throughput.

19. The computer-readable non-transitory medium of claim 16, wherein the first performance or capacity metric is based on growth so that the size calculated for a displayable feature associated with a first filesystem object within the first directory is based on a measure of growth.

\* \* \* \* \*

UNITED STATES PATENT AND TRADEMARK OFFICE
CERTIFICATE OF CORRECTION

PATENT NO. : 9,836,480 B2  
APPLICATION NO. : 14/859061  
DATED : December 5, 2017  
INVENTOR(S) : Okun et al.

Page 1 of 2

It is certified that error appears in the above-identified patent and that said Letters Patent is hereby corrected as shown below:

In the Specification

In Column 2, Line 24, delete "FIGS. 7B-7E shows" and insert -- FIGS. 7B-7E show --, therefor.

In Column 2, Line 63, delete ""user1 "" and insert -- "user1" --, therefor.

In Column 8, Line 39, delete ""USER1 "" and insert -- "USER1" --, therefor.

In Column 15, Line 13, delete "filesystems" and insert -- fllesystems. --, therefor.

In Column 15, Line 39, delete "/A 704" and insert -- /A 702 --, therefor.

In Column 16, Line 28, delete "FILE2 722)." and insert -- FILE2 724). --, therefor.

In Column 17, Line 27, delete "mentioned," and insert -- mentioned. --, therefor.

In Column 17, Lines 38-39, delete "/D 710." and insert -- /D 716. --, therefor.

In Column 18, Line 62, delete "INC," and insert -- /A/C, --, therefor.

In Column 19, Line 51, delete "an raccess" and insert -- a raccess --, therefor.

In Column 23, Line 57, delete "$e^{-t/(time\ window)}$," and insert -- $e^{-t/(time\ window)})$, --, therefor.

In Column 28, Line 51, delete ""user1 "" and insert -- "user1" --, therefor.

In Column 29, Line 3, delete ""user1 "" and insert -- "user1" --, therefor.

Signed and Sealed this  
Eleventh Day of June, 2019

Andrei Iancu  
*Director of the United States Patent and Trademark Office*

In the Claims

In Column 35, Line 14, in Claim 16, delete "for" and insert the same at Line 15 before "each" as a new sub point.